US010936016B2

(12) United States Patent
Zhang et al.

(10) Patent No.: US 10,936,016 B2
(45) Date of Patent: Mar. 2, 2021

(54) ROLLABLE DISPLAY DEVICE

(71) Applicant: WuHan TianMa Micro-electronics CO., LTD, Wuhan (CN)

(72) Inventors: Guofeng Zhang, Wuhan (CN); Yanan Wang, Wuhan (CN); Zhaokeng Cao, Shanghai (CN); Yongxin He, Shanghai (CN); Tianqing Hu, Shanghai (CN)

(73) Assignee: WuHan TianMa Micro-electronics CO., LTD., Wuhan (CN)

( * ) Notice: Subject to any disclaimer, the term of this patent is extended or adjusted under 35 U.S.C. 154(b) by 0 days.

(21) Appl. No.: 16/732,058

(22) Filed: Dec. 31, 2019

(65) Prior Publication Data

US 2020/0341518 A1  Oct. 29, 2020

(30) Foreign Application Priority Data

Apr. 28, 2019  (CN) .......................... 201910349797.9

(51) Int. Cl.
*G06F 1/16* (2006.01)
*G09F 9/30* (2006.01)
(Continued)

(52) U.S. Cl.
CPC ............ *G06F 1/1652* (2013.01); *G09F 9/301* (2013.01); *G09F 11/02* (2013.01); *H05K 5/0017* (2013.01)

(58) Field of Classification Search
CPC combination set(s) only.
See application file for complete search history.

(56) References Cited

U.S. PATENT DOCUMENTS 7,237,350 B1 *  7/2007  Zarelius .............. G09F 15/0025
                                                       40/605
8,028,449 B2 *  10/2011  Zarelius .............. G09F 15/0025
                                                       40/610
(Continued)

FOREIGN PATENT DOCUMENTS

CN        104536531 A       4/2015
CN        104882078 A       9/2015
(Continued)

OTHER PUBLICATIONS

First Chinese Office Action, dated Oct. 12, 2020, issued in corresponding Chinese Application No. 201910349797.9, filed Apr. 28, 2019, 15 pages.

*Primary Examiner* — Lisa Lea-Edmonds
(74) *Attorney, Agent, or Firm* — Christensen O'Connor Johnson Kindness PLLC

(57) ABSTRACT

A rollable display device is provided, including: a flexible display panel including a plurality of edges; a fixing portion including a plurality of fixing rods for fixing some of the plurality of edges of the flexible display panel when the flexible display panel is in a second state; and a receiving portion including a cavity. In a first state, the flexible display panel is rolled and received into the cavity of the receiving portion with a first direction as an axis; and the plurality of fixing rods extends in the first direction and is received into the cavity of the receiving portion. In the second state, the flexible display panel is at least partially unrolled outside the receiving portion, and the plurality of fixing rods is located outside the cavity, extends in a second direction and supports the flexible display panel. The first direction intersects with the second direction.

20 Claims, 12 Drawing Sheets

(51) Int. Cl.
*G09F 11/02* (2006.01)
*H05K 5/00* (2006.01)

(56) References Cited

U.S. PATENT DOCUMENTS

| | | | | |
|---|---|---|---|---|
| 8,199,471 | B2* | 6/2012 | Bemelmans | G09F 11/29 |
| | | | | 361/679.21 |
| 9,519,313 | B2* | 12/2016 | Kim | G06F 1/166 |
| 9,772,657 | B2* | 9/2017 | Takayanagi | H04M 1/0268 |
| 9,911,369 | B2* | 3/2018 | Kim | G09F 9/301 |
| 10,162,387 | B2* | 12/2018 | Takayanagi | G06F 1/1679 |
| 10,321,583 | B2* | 6/2019 | Seo | H05K 5/0017 |
| 2014/0292672 | A1* | 10/2014 | Choi | G06F 1/1652 |
| | | | | 345/173 |
| 2016/0120022 | A1* | 4/2016 | Lee | G06F 1/1652 |
| | | | | 361/749 |
| 2016/0205791 | A1* | 7/2016 | Kim | H05K 5/02 |
| | | | | 361/679.01 |
| 2018/0014417 | A1* | 1/2018 | Seo | H05K 1/189 |
| 2018/0359869 | A1* | 12/2018 | Kim | G09F 9/301 |
| 2018/0374452 | A1* | 12/2018 | Choi | G06F 3/04883 |
| 2019/0012008 | A1* | 1/2019 | Yoon | G06F 1/1615 |
| 2019/0138058 | A1* | 5/2019 | Kwon | G09G 3/22 |
| 2019/0278335 | A1* | 9/2019 | Yeh | G06F 1/1601 |
| 2019/0324501 | A1* | 10/2019 | Kim | G09F 9/301 |
| 2020/0013317 | A1* | 1/2020 | Cho | G09F 9/301 |
| 2020/0077194 | A1* | 3/2020 | Kim | H04R 7/04 |
| 2020/0135064 | A1* | 4/2020 | Lee | G09F 9/301 |
| 2020/0154580 | A1* | 5/2020 | Shin | H05K 1/147 |
| 2020/0159288 | A1* | 5/2020 | Song | G06F 1/1652 |
| 2020/0160760 | A1* | 5/2020 | Park | H04R 1/2896 |
| 2020/0168131 | A1* | 5/2020 | Park | G06F 1/1652 |
| 2020/0168153 | A1* | 5/2020 | Wakata | G09G 3/3291 |
| 2020/0170114 | A1* | 5/2020 | Choi | G06F 1/1652 |
| 2020/0201394 | A1* | 6/2020 | Choi | H05K 5/0017 |

FOREIGN PATENT DOCUMENTS

| | | |
|---|---|---|
| CN | 105528963 A | 4/2016 |
| CN | 105788461 A | 7/2016 |
| CN | 107316566 A | 11/2017 |

* cited by examiner

ROLLABLE DISPLAY DEVICE

CROSS-REFERENCE TO RELATED APPLICATIONS

The present application claims priority to Chinese Patent Application No. 201910349797.9, filed on Apr. 28, 2019, the content of which is incorporated herein by reference in its entirety.

TECHNICAL FIELD

The present disclosure relates to the technical field of display technologies, and in particular, to a rollable display device.

BACKGROUND

With continuous development of display technologies, in order to meet different use requirements, various display products with different performances have emerged. A rollable display device is such a display product with flexibility. In use, a user can roll and fold the rollable display device as needed to reduce a size of the display device and improve a portability of the display device. Alternatively, the user can unroll and unfold the rollable display device to obtain a large display image. The rollable display device has become a focus of researchers due to its advantages of being portable and configured to provide a large display image.

SUMMARY

The present disclosure provides a rollable display device, and the rollable display device can present at least a first state having a small volume and being portable, and a second state for large screen display. Moreover, the rollable display device can be switched between the first state and the second state conveniently and quickly while achieving flatness of the flexible display panel in the second state, so that the flexible display panel does not have problems such as wrinkles.

The rollable display device includes: a flexible display panel including a plurality of edges; a fixing portion including a plurality of fixing rods for fixing the plurality of edges of the flexible display panel when the flexible display panel is in a second state; and a receiving portion including a cavity. In a first state, the flexible display panel is rolled and received into the cavity of the receiving portion with a first direction as an axis; and the plurality of fixing rods extends in the first direction and is received into the cavity of the receiving portion. In the second state, the flexible display panel is at least partially unrolled outside the receiving portion, and the plurality of fixing rods is located outside the cavity, extends in a second direction and supports the flexible display panel. The first direction intersects with the second direction.

BRIEF DESCRIPTION OF DRAWINGS

In order to more clearly illustrate technical solutions in embodiments of the present disclosure, the accompanying drawings used in the embodiments are briefly introduced as follows.

DESCRIPTION OF EMBODIMENTS

For better illustrating technical solutions of the present disclosure, embodiments of the present disclosure will be described in detail as follows with reference to the accompanying drawings.

It should be noted that, the described embodiments are embodiments of the present disclosure, which shall not be interpreted as providing limitations to the present disclosure.

The terms used in the embodiments of the present disclosure are for the purpose of describing particular embodiments but not intended to limit the present disclosure. Unless otherwise noted in the context, the singular form expressions "a", "an", "the" and "said" used in the embodiments and appended claims of the present disclosure are also intended to represent plural form expressions thereof.

It should be understood that the term "and/or" used herein is an association relationship describing associated objects, indicating that there may be three relationships, for example, A and/or B may indicate that three cases, i.e., A existing individually, A and B existing simultaneously, B existing individually. In addition, the character "/" herein generally indicates that the related objects before and after the character form an "or" relationship.

It should be understood that although a direction may be described using the terms of "first", "second", etc., in the embodiments of the present disclosure, the direction will not be limited to these terms. These terms are used to distinguish directions from one another. For example, without departing from the scope of the embodiments of the present disclosure, a first direction may also be referred to as a second direction, and similarly, a second direction may also be referred to as a first direction.

Figure 1:
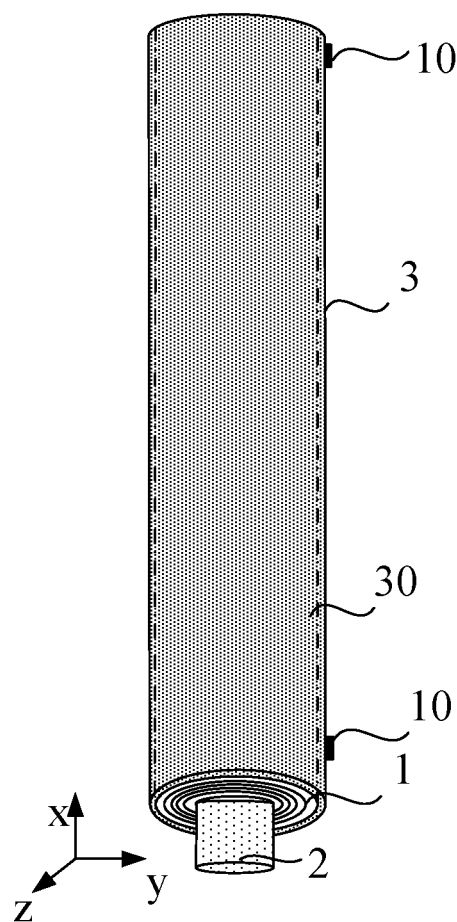
FIG. 1 is a schematic perspective view of a rollable display device in a first state according to an embodiment of the present disclosure.
Figure 2:
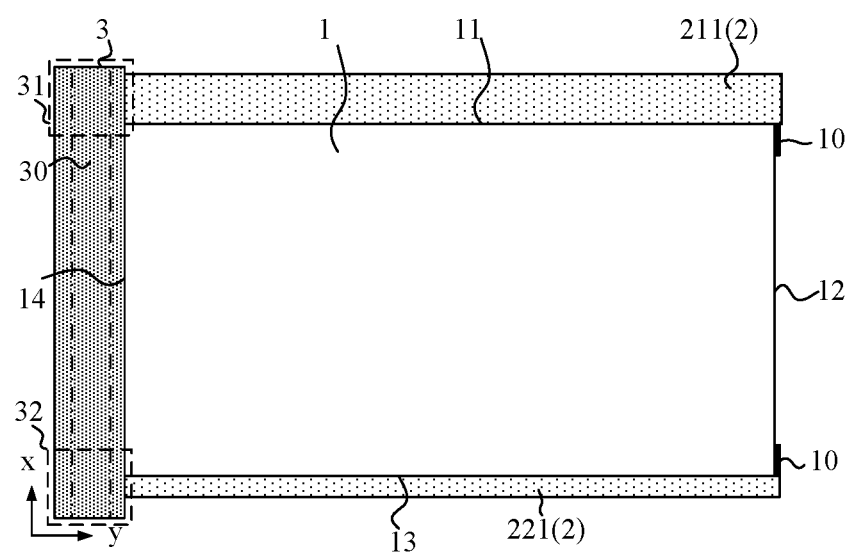
FIG. 2 is a schematic top view of the rollable display device shown in FIG. 1 in a second state according to an embodiment of the present disclosure.

An embodiment of the present disclosure provides a rollable display device, and the rollable display device can be configured in a plurality of different states. FIG. 1 is a schematic perspective view of a rollable display device in a first state according to an embodiment of the present disclosure. FIG. 2 is a schematic top view of the rollable display device shown in FIG. 1 in a second state according to an embodiment of the present disclosure. As shown in FIG. 1 and FIG. 2, the rollable display device includes a flexible display panel 1, a fixing portion, and a receiving portion 3. The receiving portion 3 includes a cavity 30. The flexible display panel 1 includes a plurality of edges, and the fixing portion includes a plurality of fixing rods 2.

For example, when the rollable display device is not used for display, the rollable display device can be in the first state shown in FIG. 1. In the first state, the flexible display panel 1 is rolled and received into a cavity 30 of the receiving portion 3 with a first direction x as a rolling axis. Each of the plurality of fixing rods 2 extends along the first direction x and is received into the cavity 30 of the receiving portion 3. That is, the first state is a state in which the flexible display panel 1 is not used for display and is rolled into the receiving portion 3, and in the first state, the fixing rods 2 are also received into the cavity 30 of the receiving portion 3. In this way, the rollable display device occupies a smaller space, and thus is more portable.

When the rollable display device is used for display, the rollable display device may be in the second state shown in FIG. 2. In the second state, the flexible display panel 1 is at least partially unrolled outside the receiving portion 3, and the fixing rods are disposed outside the cavity 30 of the receiving portion 3, and extend along the second direction y and support the flexible display panel 1. The fixing rod 2 is used for fixing the edge of the flexible display panel 1 when the flexible display panel 1 is in the second state. The fixing rod 2 can fix the flexible display panel 1 in the unrolled state by fixing the edge of the flexible display panel 1. In an example, the second state may be a state in which the flexible display panel is unrolled. In this case, the rollable display device can display an image having the largest area, thereby improving the viewing experience for the user.

In an example, the first direction x intersects with the second direction y, and after the flexible display panel 1 is unrolled, both the first direction x and the second direction y are parallel with a plane of the flexible display panel 1.

Figure 3:
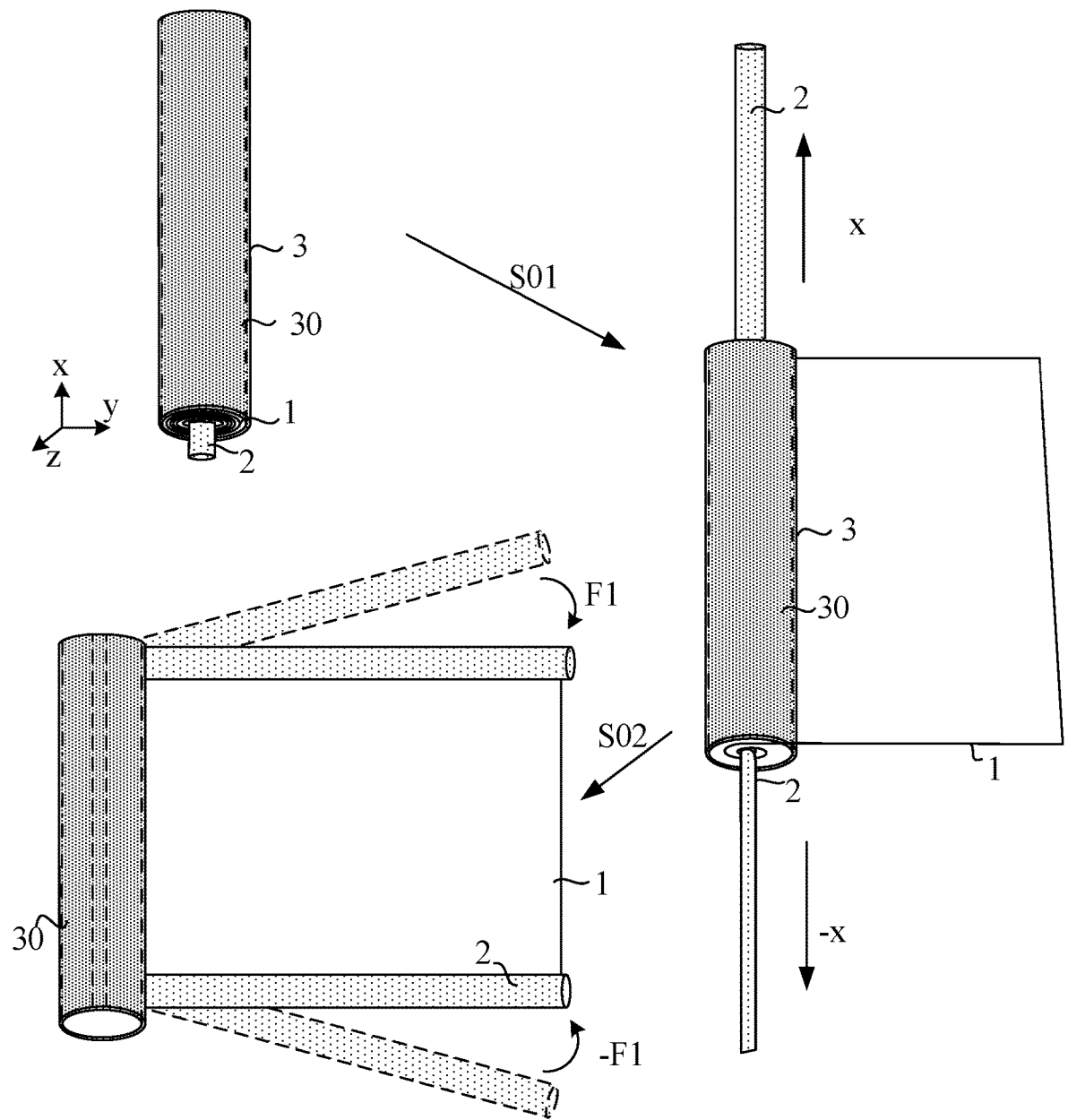
FIG. 3 is a schematic flowchart of a rollable display device being switched from the first state to the second state according to an embodiment of the present disclosure.

FIG. 3 is a schematic flowchart of a rollable display device being switched from a first state to a second state according to an embodiment of the present disclosure. As shown in FIG. 3, when the rollable display device is switched between the first state and the second state, a switching process thereof includes following steps.

At step S01, when the rollable display device is in the first state shown in FIG. 1, a plurality of fixing rods 2 is moved out of the cavity 30 of the receiving portion 3, during which a direction of a relative displacement between the fixing rods 2 and the receiving portion 3 is parallel with the first direction x. Here, each fixing rod 2 can be moved in the first direction x or a direction −x opposite to the first direction x, so that the fixing rod 2 is moved out of the cavity 30 of the receiving portion 3. Then, the fixing rod 2 and the receiving portion 3 have same extending directions.

At Step S02, the extending direction of the fixing rod 2 is adjusted to be along the second direction y, and the flexible display panel 1 is moved out of the cavity 30 of the receiving portion 3, so that an edge of the flexible display panel 1 is fixed by a corresponding fixing rod 2. In this way, the rollable display device is adjusted to be in the second state shown in FIG. 2. Specifically, when adjusting the extending direction of the fixing rod 2, each fixing rod 2 may be rotated along a direction F1 or a direction −F1 with its connection position with the receiving portion 3 as a rotation axis. When the flexible display panel 1 is being moved, the flexible display panel 1 can be unrolled along the second direction y and be moved out of the cavity 30 of the receiving portion 3.

With the above description of a process of switching the rollable display device between the first state and the second state, it can be seen that the rollable display device in this embodiment of the present disclosure is provided with the fixing rod 2 that extends along the first direction x and is received into the cavity 30 of the receiving portion 3 in the first state. Moreover, in the first state, the flexible display panel 1 is also received into the receiving portion 3, so as to reduce a volume of the rollable display device and save space, thereby improving portability of the rollable display device. In the second state, the fixing rod 2 is out of the cavity 30 of the receiving portion 3, and the fixing rod 2 extends in the second direction y and supports the flexible display panel 1. In this way, the fixing rod 2 can stably support the flexible display panel 1. Further, in the second state, the flexible display panel does not have problems such as wrinkles, and thus flatness of the flexible display panel is improved.

In addition, with such a structure of the rollable display device, when the rollable display device is switched between the first state and the second state, the extending direction of the fixing rod 2 may be converted by means of rotation or the like, so as to make a positional relationship between the fixing rod 2 and the receiving portion 3 change. In this way, the rollable display device can adapt to different states, and an operation thereof is simple and convenient. Moreover, in this embodiment of the present disclosure, when the positional relationship between the fixing rod 2 and the receiving portion 3 is adjusted by means of rotation or the like, a structure of the fixing rod 2 does not need to be adjusted. Therefore, compared with a case in which the fixing rod 2 is also rolled into the receiving portion 3 along with the flexible display panel 1, this embodiment for example can improve structural stability of the fixing rod 2, so that the fixing rod 2 is less likely to deform. Thus, in the second state, the stability of the fixing rod 2 for fixing the edge of the fixed flexible display panel 1 can be improved, thereby further improving the flatness of the flexible display panel.

It should be understood that when the rollable display device is to be switched from the second state to the first state, an inverse process of the process shown in FIG. 3 may be performed, and details thereof will not be further described herein.

In an example, the receiving portion 3 and the fixing rod 2 described above are hinged or jointed to each other, so that the two can be detachably and movably connected to each other.

Figure 4:
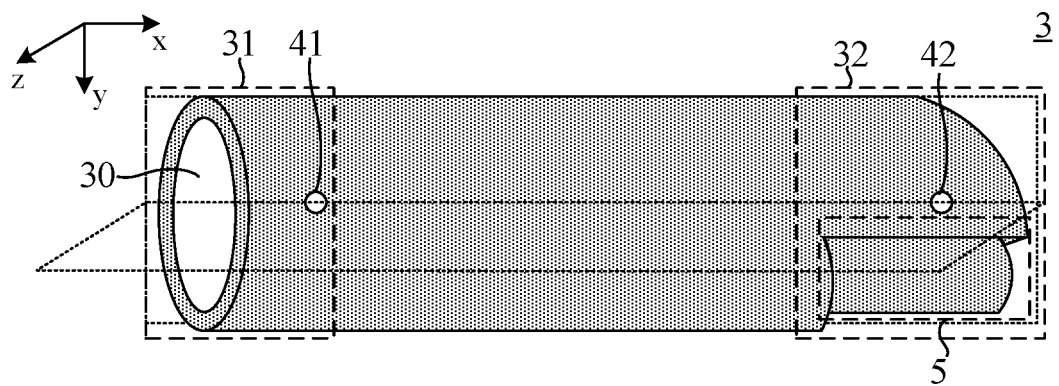
FIG. 4 is a schematic perspective view of a receiving portion of a rollable display device according to an embodiment of the present disclosure.
Figure 5:
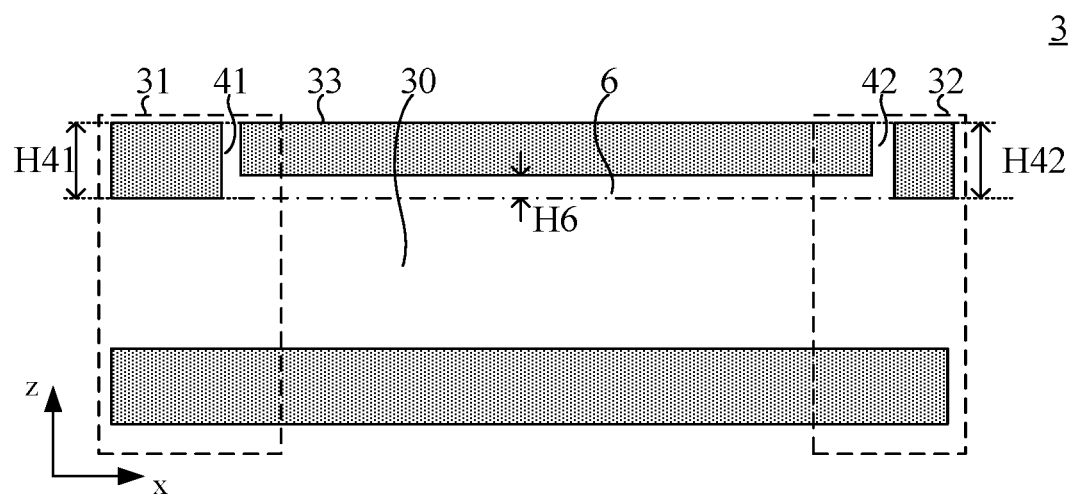
FIG. 5 is a schematic cross-sectional view of FIG. 4 taken along a plane parallel with a first direction x and a third direction z.
Figure 6:
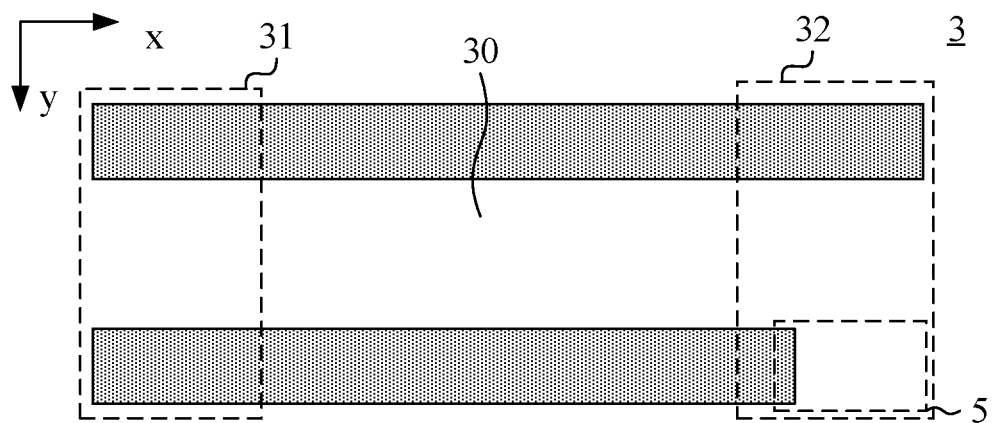
FIG. 6 is a schematic cross-sectional view of FIG. 4 taken along a plane parallel with the first direction x and a second direction y.

FIG. 4 is a schematic perspective view of a receiving portion of a rollable display device according to an embodiment of the present disclosure. FIG. 5 is a schematic cross-sectional view of FIG. 4 taken along a plane parallel with a first direction x and a third direction z. FIG. 6 is a schematic cross-sectional view of FIG. 4 taken along a plane parallel with a first direction x and a second direction y. In an example, as shown in FIGS. 4-6, the third direction z intersects with the plane parallel with the first direction x and the second direction y. That is, the third direction z is any direction intersecting with the plane in which the flexible display panel 1 is located when the flexible display panel 1 is unrolled. For example, the third direction z may be a direction perpendicular to the first direction x and the second direction y. The receiving portion 3 includes a first end 31 including a first limiting hole 41, and a second end 32 including a second limiting hole 42. The second end 32 of the receiving portion 3 further includes a notch 5. Here, the notch 5 does not overlap the second limiting hole 42. Moreover, the notch 5 means that the receiving portion 3 is provided with no physical structure surrounding the cavity 30 at the notch. With the notch 5, the fixing rod 2 can rotate relative to the receiving portion 3. Therefore, in the second state, the fixing rod 2 can extend out of the receiving portion 3 from the notch 5 along the second direction y in a case where the fixing rod 2 is connected to the receiving portion 3, so as to fix the edge of the flexible display panel 1.

As shown in FIG. 5, the receiving portion 3 further includes a sliding groove 6, which is located between the first limiting hole 41 and the second limiting hole 42 and communicates with both the first limiting hole 41 and the second limiting hole 42. As shown in FIG. 5, the first limiting hole 41, the second limiting hole 42 and the sliding groove 6 each extend from the cavity 30 of the receiving portion 3 towards a side wall 33 of the receiving portion along the third direction z. Moreover, in the third direction z, a depth H6 of the sliding groove 6 is smaller than a depth H41 of the first limiting hole 41 and also smaller than a depth H42 of the second limiting hole 42, so that the sliding groove 6 is enclosed by the side wall 33 of the receiving portion 3 to be in the receiving portion 3.

Figure 7:
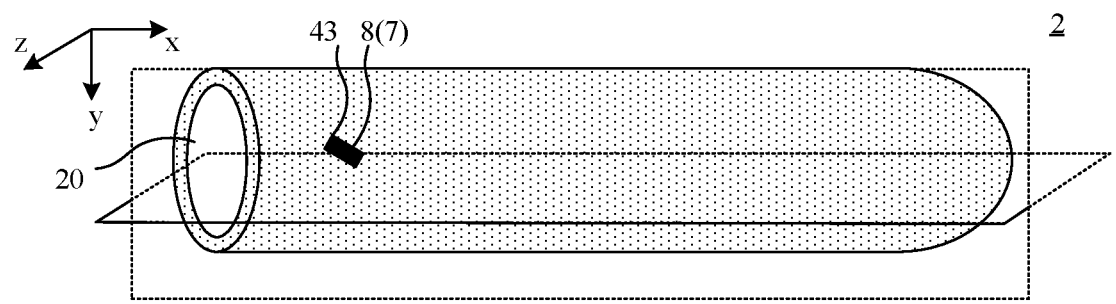
FIG. 7 is a schematic perspective view of a fixing rod of a rollable display device according to an embodiment of the present disclosure.
Figure 8:
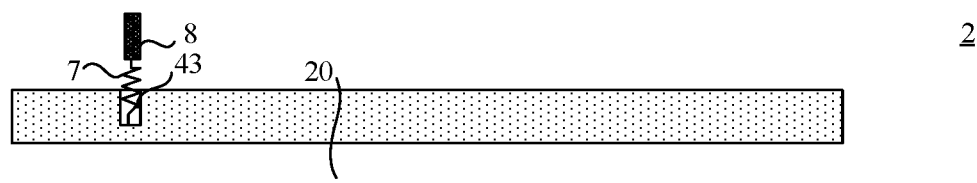
FIG. 8 is a schematic cross-sectional view of FIG. 7 taken along a plane parallel with the first direction x and the third direction z.
Figure 8:
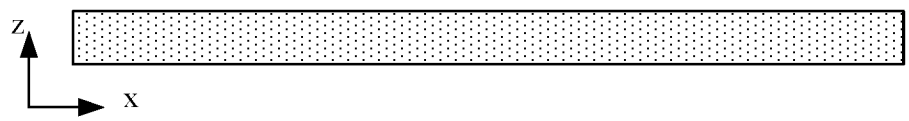
Figure 9:
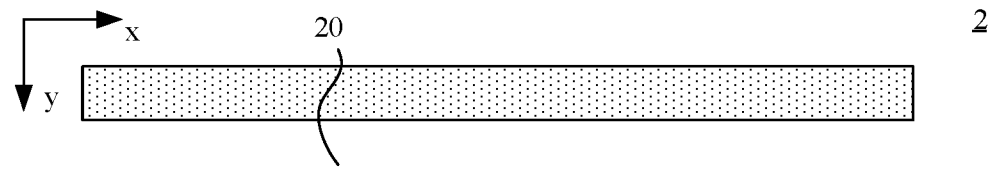
FIG. 9 is a schematic cross-sectional view of FIG. 7 taken along a plane parallel with the first direction x and the second direction y.
Figure 9:
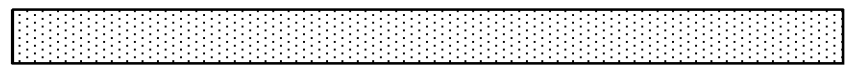

FIG. 7 is a schematic perspective view of a fixing rod of a rollable display device according to an embodiment of the present disclosure. FIG. 8 is a schematic cross-sectional view of FIG. 7 taken along a plane parallel with a first direction x and a third direction z. FIG. 9 is a schematic cross-sectional view of FIG. 7 taken along a plane parallel with a first direction x and a second direction y. As shown in FIGS. 7-9, the fixing rod 2 includes a third limiting hole 43, which extends from an outer surface of the fixing rod 2 towards an interior of the fixing rod 2 along a direction parallel with the third direction z. A spring 7 is provided in the third limiting hole 43, and the spring 7 can be stretched or compressed in an extending direction of the third limiting hole 43. The fixing rod 2 further includes a fixing shaft 8 connected to the spring 7, and an extending direction of the fixing shaft 8 is the same as the extending direction of the third limiting hole 43. In an example, as shown in FIG. 8, the fixing shaft 8, the third limiting hole 43 and the spring 7 each extend along the third direction z.

In an example, the fixing shaft 8 may be in a columnar structure matching a shape of the first limiting hole 41 and a shape of the second limiting hole 42. For example, when the first limiting hole 41 and the second limiting hole 42 each have a cylindrical shape, the fixing shaft 8 may also be shaped as a cylindrical shape, and a diameter of the fixing shaft 8 is smaller than a diameter of the first limiting hole 41 and smaller than a diameter of the second limiting hole 42. It should be noted that, the fixing shaft 8 may also be designed as a prismatic structure or the like as long as the fixing shaft 8 can move in the extending direction of the first limiting hole 41 and in the extending direction of the second limiting hole 42. In an example, the fixing shaft 8 and the fixing rod 2 may be made of a same material, such as metal or plastic.

In an embodiment, as shown in FIG. 8 and FIG. 9, the fixing rod 2 may also include a cavity 20 that extends along the same direction as its extending direction.

Figure 10:
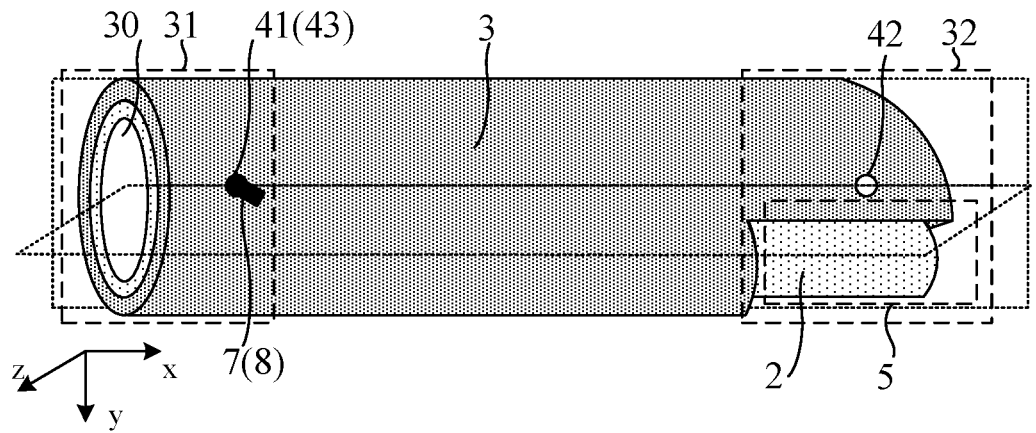
FIG. 10 is a schematic perspective view of a fixing rod and a receiving portion of a rollable display device in the first state according to an embodiment of the present disclosure.
Figure 11:
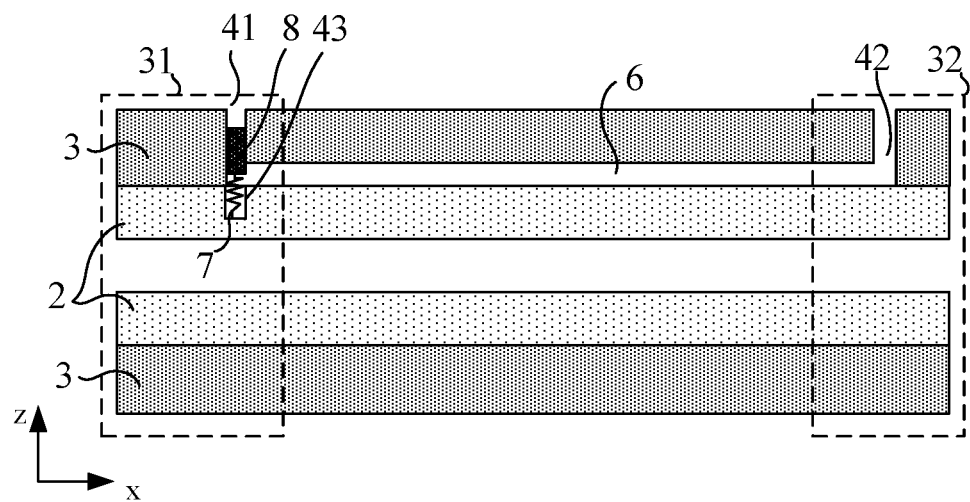
FIG. 11 is a schematic cross-sectional view of FIG. 10 taken along a plane parallel with the first direction x and the third direction z.
Figure 12:
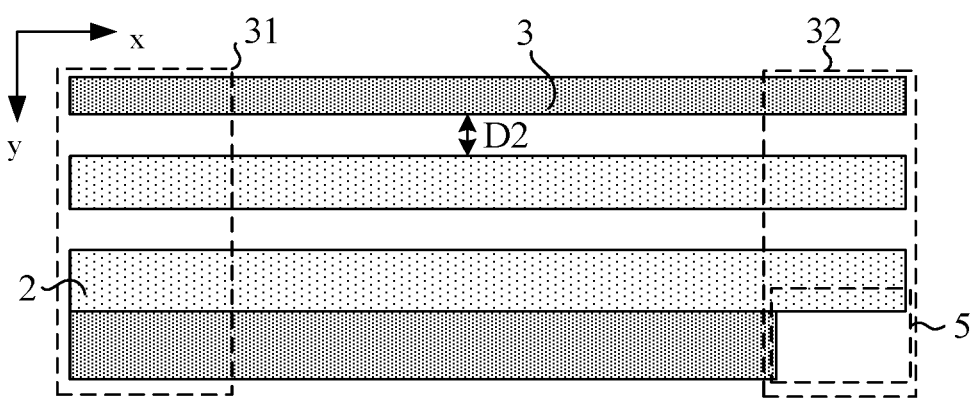
FIG. 12 is a schematic cross-sectional view of FIG. 10 taken along a plane parallel with the first direction x and the second direction y.

FIG. 10 is a schematic perspective view of a fixing rod and a receiving portion of a rollable display device in a first state according to an embodiment of the present disclosure. FIG. 11 is a schematic cross-sectional view of FIG. 10 taken along a plane parallel with a first direction x and a third direction z. FIG. 12 is a schematic cross-sectional view of FIG. 10 taken along a plane parallel with a first direction x and a second direction y. As shown in FIG. 10, FIG. 11 and FIG. 12, the first limiting hole 41 overlaps the third limiting hole 43, and the fixing shaft 8 and the spring 7 are located in the first limiting hole 41 and in the third limiting hole 43. In this case, the fixing shaft 8 cannot move due to limitation by the first limiting hole 41, so the positional relationship between the fixing rod 2 and the receiving portion 3 in the first state is fixed, thereby avoiding a relative displacement therebetween. This can achieve structural stability of the rollable display device in the first state.

Figure 13:
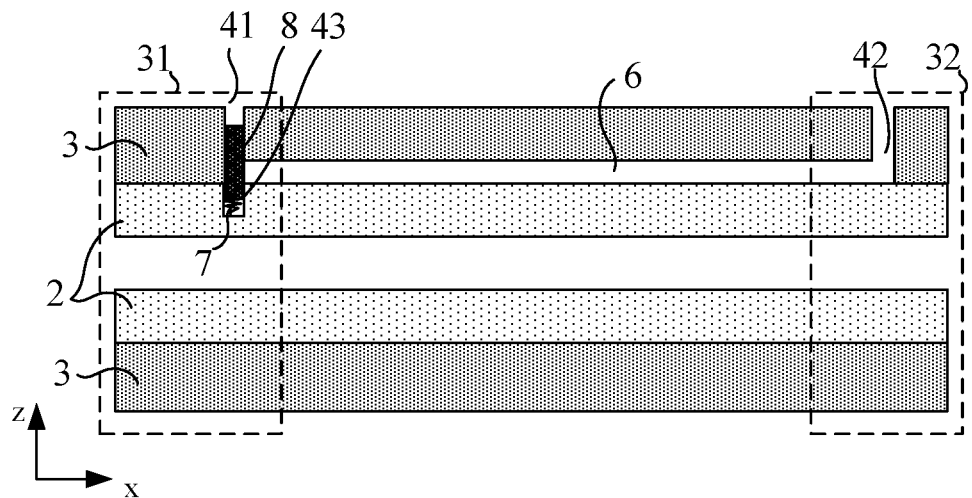
FIG. 13 is another schematic cross-sectional view of FIG. 10 taken along a plane parallel with the first direction x and the third direction z.

In an embodiment of the present disclosure, a length relationship between the fixing shaft 8 and the spring 7 in the third direction z is not limited. For example, as shown in FIG. 11, the spring 7 may have a large length while the fixing shaft 8 may have a small length. In this case, in the first state, the spring 7 can extend out of the third limiting hole 43, and the fixing shaft 8 is located in the first limiting hole 41 (e.g., only the fixing shaft 8 is located in the first limiting hole 41). Alternatively, as shown in FIG. 13, which is another schematic cross-sectional view of FIG. 10 taken along a plane parallel with a first direction x and a third direction z, the fixing shaft 8 may have a large length while the spring 7 may have a small length. In this case, in the first state, the fixing shaft 8 is placed in the first limiting hole 41 and in the third limiting hole 43, and movement of the fixing shaft 8 in the first direction x is limited by a combined limiting function of the first limiting hole 41 and the third limiting hole 43. This can achieve the structural stability of the rollable display device in the first state.

Figure 14:
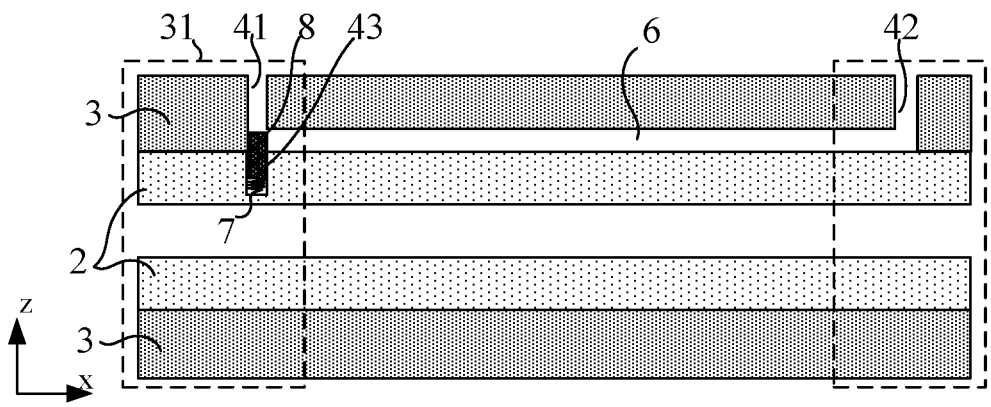
FIG. 14 is a schematic view showing a spring deforming due to extrusion in FIG. 11 and FIG. 13.
Figure 15:
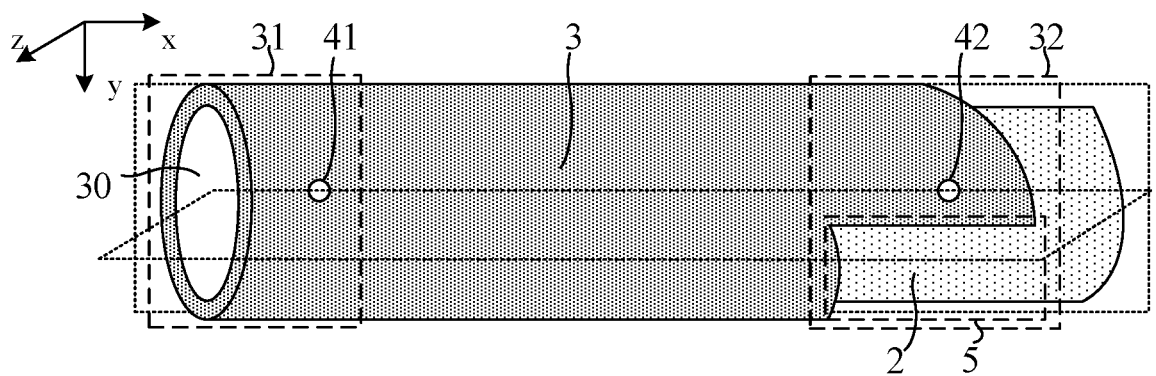
FIG. 15 is a schematic perspective view of a fixing rod and a receiving portion of a rollable display device in a third state according to an embodiment of the present disclosure.
Figure 16:
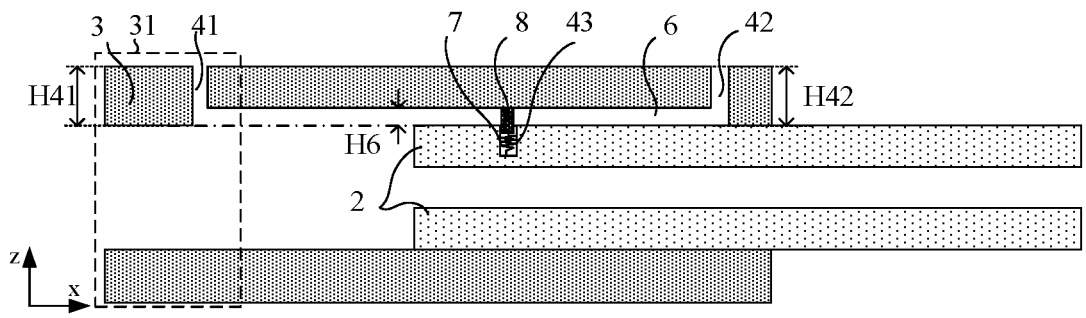
FIG. 16 is a schematic cross-sectional view of FIG. 15 taken along a plane parallel with the first direction x and the third direction z.
Figure 17:
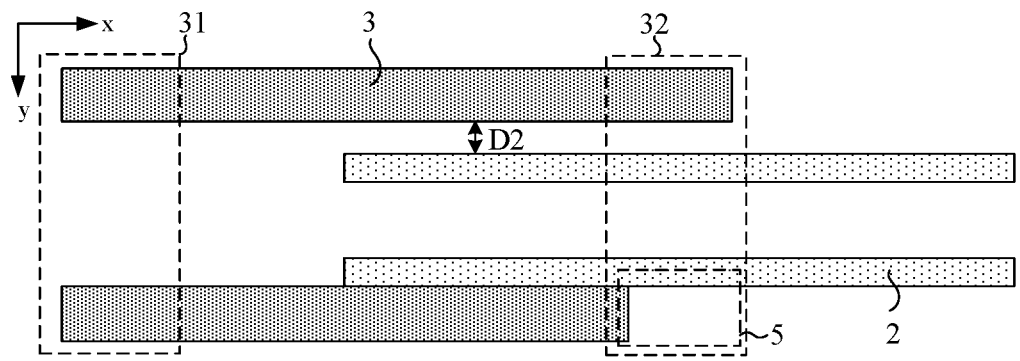
FIG. 17 is a schematic cross-sectional view of FIG. 15 taken along a plane parallel with the first direction x and the second direction y.

With reference to FIG. 11 and FIG. 13, the rollable display device can be switched from the first state to the second state by pressing the fixing shaft 8 located in the first limiting hole 41. That is, a force parallel with the third direction z is applied to cause the spring to be compressed and then deform, so as to allow the fixing shaft 8 to move in the direction −z towards along a direction facing away from the first limiting hole 41 to a state shown in FIG. 14. Here, FIG. 14 is a schematic view showing a spring deforming due to extrusion in FIG. 11 and FIG. 13. At this time, in the first direction x, the fixing shaft 8 is no longer in contact with a hole wall of the first limiting hole 41 close to the second limiting hole 42, that is, the fixing shaft 8 can be freed from limitation by the first limiting hole 41. In this case, when a force in the first direction x is applied to the fixing rod 2, the fixing rod 2 will move relative to the receiving portion 3, and the fixing shaft 8 and the spring 7 will also move in the sliding groove 6 with the fixing rod 2. In an example, the state in which the fixing shaft 8 is located in the sliding groove 6 is a third state. FIG. 15 is a schematic perspective view of a fixing rod and a receiving portion of a rollable display device in the third state according to an embodiment of the present disclosure. FIG. 16 is a schematic cross-sectional view of FIG. 15 taken along a plane parallel with a first direction x and a third direction z. FIG. 17 is a schematic cross-sectional view of FIG. 15 taken along a plane parallel with a first direction x and a second direction y. At this time, as shown in FIGS. 15-17, in the third state, under an external force, the fixing shaft 8 and the spring 7 can move along the sliding groove 6 with movement of the fixing rod 2 until the third limiting hole 43 of the fixing rod 2 overlaps the second limiting hole 42 of the receiving portion 3 and the fixing shaft 8 is located in the second limiting hole 42. When the fixing shaft 8 and the spring 7 move in the sliding groove 6, since the sliding groove 6 has a small depth H6, deformation of the spring 7 at this time is larger than deformation of the spring 7 in the first state and the second state, so that the fixing shaft 8 can move out of the first limiting hole 41 and will not be hindered by the receiving portion 3 when moving in the first direction x.

Figure 18:
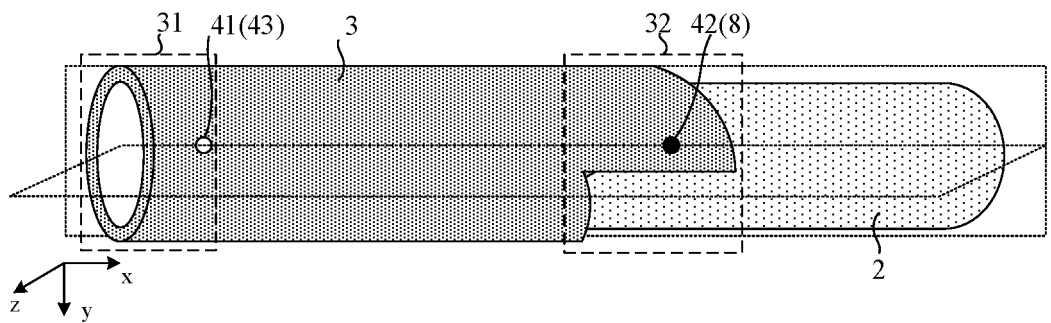
FIG. 18 is a schematic perspective view of a fixing rod and a receiving portion of a rollable display device in a fourth state according to an embodiment of the present disclosure.
Figure 19:
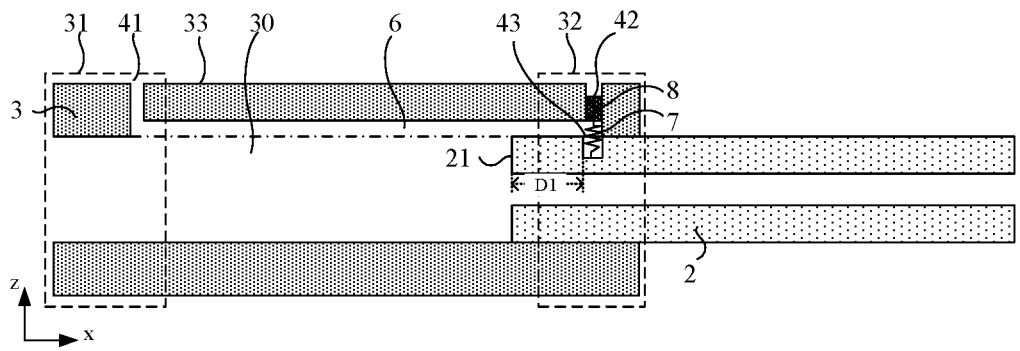
FIG. 19 is a schematic cross-sectional view of FIG. 18 taken along a plane parallel with the first direction x and the third direction z.
Figure 20:
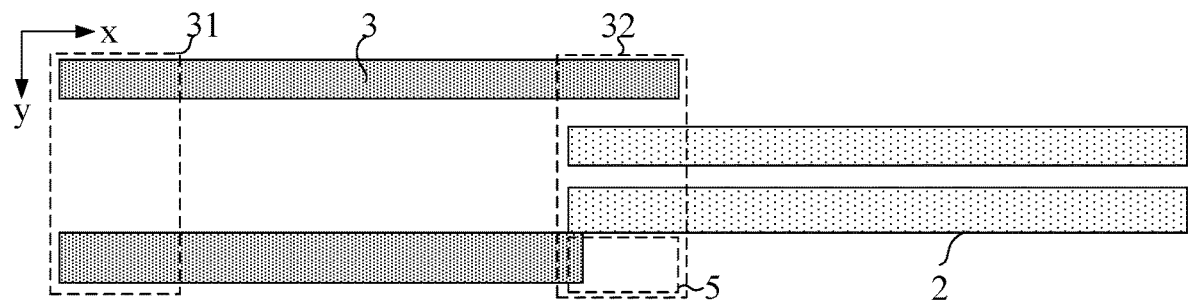
FIG. 20 is a schematic cross-sectional view of FIG. 18 taken along a plane parallel with the first direction x and the second direction y.

When the fixing shaft 8 and the spring 7 continuously move to the second limiting hole 42, it is switched to a fourth state in which the third limiting hole 43 overlaps the second limiting hole 42, and the fixing rod 2 and the receiving portion 3 extend in a same direction. FIG. 18 is a schematic perspective view of a fixing rod and a receiving portion of a rollable display device in the fourth state according to an embodiment of the present disclosure. FIG. 19 is a schematic cross-sectional view of FIG. 18 taken along a plane parallel with a first direction x and a third direction z. FIG. 20 is a schematic cross-sectional view of FIG. 18 taken along a plane parallel with a first direction x and a second direction y. At this time, as shown in FIGS. 18-20, the third limiting hole 43 overlaps the second limiting hole 42, and a depth of the second limiting hole 42 is larger than a depth of the sliding groove 6. Therefore, a compression degree of the spring 7 will be reduced, that is, deformation of the spring 7 will be reduced. The fixing shaft 8 connected to the spring 7 will move towards the second limiting hole 42 with movement of the spring 7. After the fixing shaft 8 moves into the second limiting hole 42, the fixing shaft 8 will be hindered by a hole wall of the second limiting hole 42 and cannot continuously move along the first direction x. In other words, the second limiting hole 42 serves to limit a relative displacement between the fixing rod 2 and the receiving portion 3 in a direction parallel with the first direction x.

In an example, the first limiting hole 41 and the second limiting hole 42 described above penetrate a side wall of the receiving portion 3. In this case, when the fixing shaft 8 moves into the first limiting hole 41 or the second limiting hole 42, the fixing shaft 8 can be moved out of the first limiting hole 41 or the second limiting hole 42 by pressing the fixing shaft 8 with an external force. In this way, the fixing rod 2 can move in a direction parallel with the first direction x.

Figure 21:
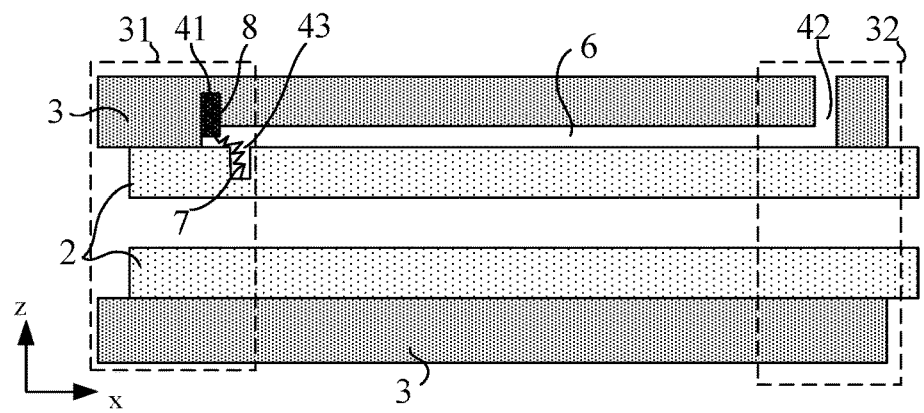
FIG. 21 is a schematic cross-sectional view of a fixing rod and a receiving portion in the first state when a first limiting hole is a blind hole.

When the first limiting hole 41 or the second limiting hole 42 is a blind hole, i.e., does not penetrate the side wall of the receiving portion 3, the fixing shaft 8 can be moved out of the first limiting hole 41 or the second limiting hole 42 by applying a large external force in the first direction x to the fixing rod 2. Here, this external force causes the spring to be bent to a certain degree, that is, this external force changes the extending direction of the spring to a bent state as shown in FIG. 21. The bent spring 7 will exert a force in the direction −z to the fixing shaft 8, so that the fixing shaft 8 can be moved out of the first limiting hole 41 even if the fixing shaft 8 is made of a material having a small hardness.

Figure 22:
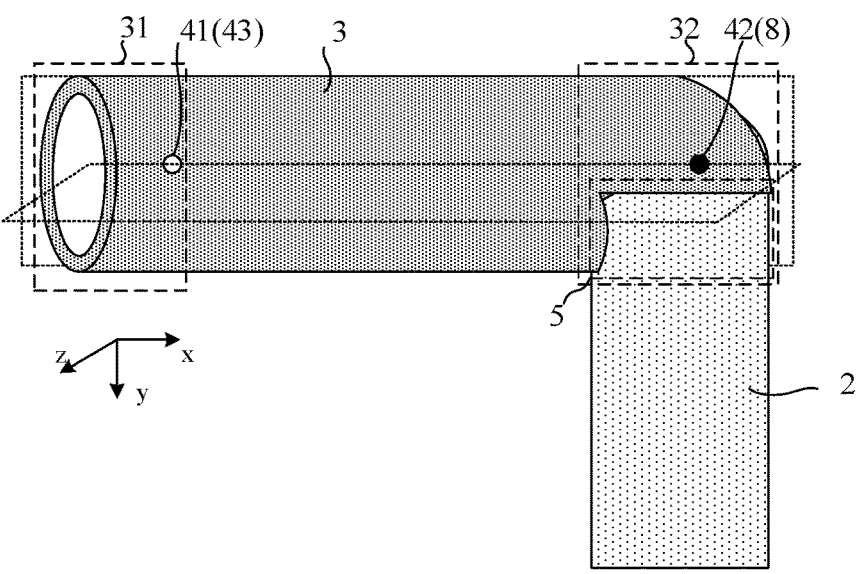
FIG. 22 is a schematic perspective view of a fixing rod and a receiving portion of a rollable display device in the second state according to an embodiment of the present disclosure.
Figure 23:
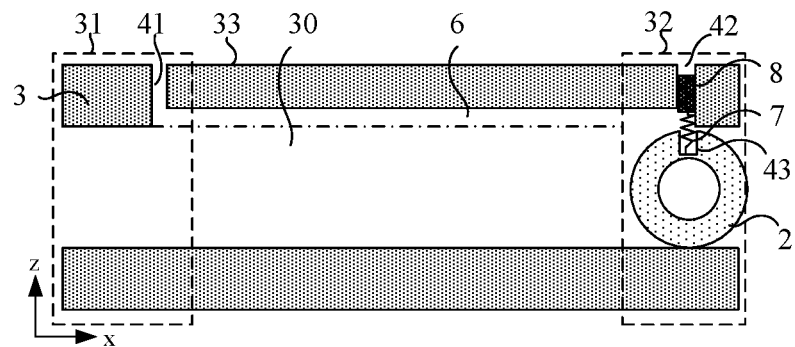
FIG. 23 is a schematic cross-sectional view of FIG. 22 taken along a plane parallel with the first direction x and the third direction z.
Figure 24:
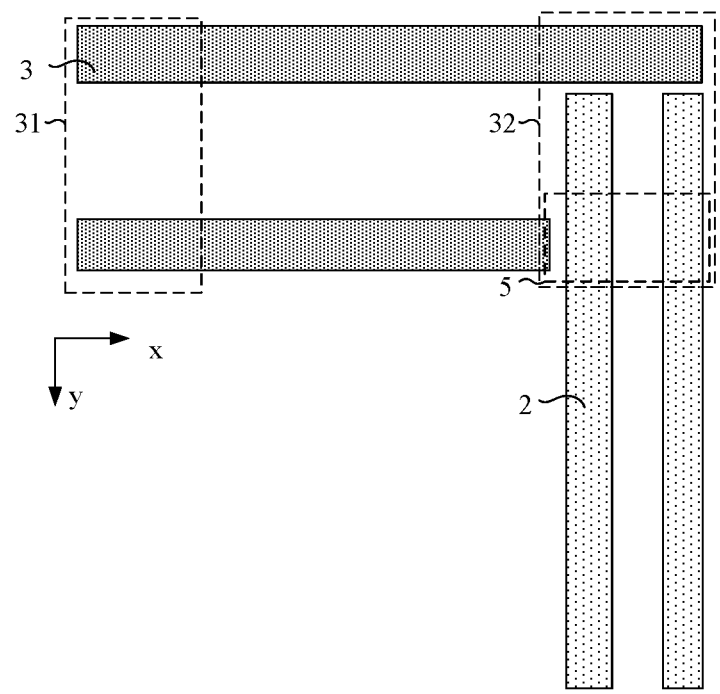
FIG. 24 is a schematic cross-sectional view of FIG. 22 taken along a plane parallel with the first direction x and the second direction y.

When the fixing rod 2 is moved to a position where the third limiting hole 43 overlaps the second limiting hole 42 and the extending direction of the fixing rod 2 is the same as the extending direction of the receiving portion 3, as shown in FIG. 18 and FIG. 20, in a plane defined by the first direction x and the second direction y, the fixing rod 2 can be rotated clockwise about the fixing shaft 8 located in the second limiting hole 42 to reach the second state as shown in FIGS. 22-24. FIG. 22 is a schematic perspective view of a fixing rod and a receiving portion of a rollable display device in the second state according to an embodiment of the present disclosure. FIG. 23 is a schematic cross-sectional view of FIG. 22 taken along a plane parallel with a first direction x and a third direction z. FIG. 24 is a schematic cross-sectional view of FIG. 22 taken along a plane parallel with a first direction x and a second direction y. At this time, as shown in FIGS. 22-24, the second limiting hole 42 overlaps the third limiting hole 43, and the fixing shaft 8 and the spring 7 are located in the second limiting hole 42 and in the third limiting hole 43. In this case, the fixing portion 2 extends out of the receiving portion 3 from the notch 5 in the second direction y, so as to fix the edge of the flexible display panel (not shown) extending out of the receiving portion 3.

Figure 25:
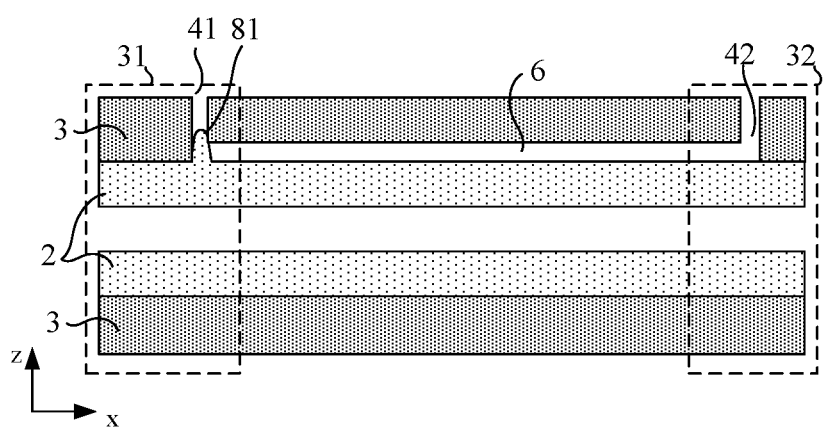
FIG. 25 is a schematic cross-sectional view of another rollable display device in the first state taken along a plane parallel with the first direction x and the third direction z according to an embodiment of the present disclosure.
Figure 26:
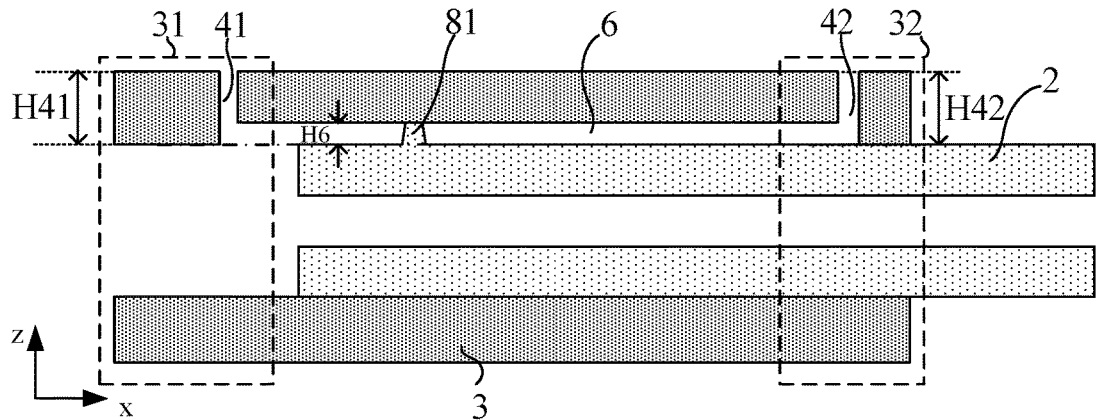
FIG. 26 is a schematic cross-sectional view of the rollable display device shown in FIG. 25 in the third state taken along a plane parallel with the first direction x and the third direction z.
Figure 27:
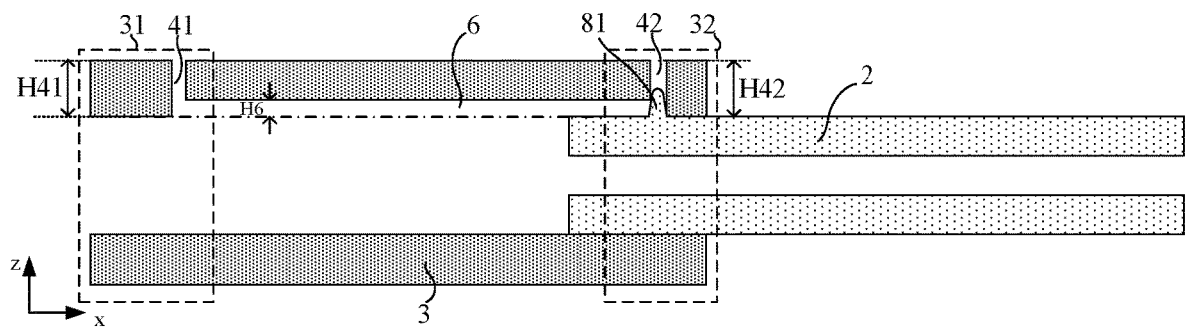
FIG. 27 is a schematic cross-sectional view of the rollable display device shown in FIG. 25 in a fourth state taken along a plane parallel with the first direction x and the third direction z.

FIG. 25 is a schematic cross-sectional view of another rollable display device in the first state taken along a plane parallel with a first direction x and a third direction z according to an embodiment of the present disclosure. As shown in FIG. 25, a protrusion 81 may be formed on an outer surface of the fixing rod 2, and the protrusion 81 and the fixing rod 2 may be formed into one piece. The protrusion 81 may be used to replace the third limiting hole 43 of the fixing rod 2, the spring 7, and the fixing shaft 8 in the above embodiment. As shown in FIG. 25, the protrusion 81 extends in the third direction z from the outer surface of the fixing rod 2 along a direction facing away from the fixing rod 2. In the first state, the protrusion 81 extends from the outer surface of the fixing rod 2 to the first limiting hole 41 located in the receiving portion 3, thereby limiting a relative displacement between the receiving portion 3 and the fixing rod 2. In an example, the protrusion 81 may be made of a material having a certain modulus of elasticity, so that a large force in the direction −z then can be applied to the protrusion 81 when the rollable display device is switched from the first state to the second state. Then, the protrusion 81 can move in the direction −z towards the fixing rod 2, causing the protrusion 81 to be compressed and deform and then move out of the first limiting hole 41. Then, the fixing rod 2 can move together with the protrusion 81 in the first direction x under an external force in the first direction x. FIG. 26 is a schematic cross-sectional view of the rollable display device shown in FIG. 25 in a third state taken along the plane parallel with the first direction x and the third direction z. As shown in FIG. 26, when the protrusion 81 moves in the sliding groove 6, since the depth H6 of the sliding groove 6 is small, deformation of the protrusion 81 at this time is larger than deformation of the protrusion 81 in the first state. When the protrusion 81 moves to overlap the second limiting hole 42, as shown in FIG. 27, which is a schematic cross-sectional view of the rollable display device shown in FIG. 25 in a fourth state taken along the plane parallel with the first direction x and the third direction z, since the depth H42 of the second limiting hole 42 is larger than the depth H6 of the sliding groove 6, deformation of the protrusion 81 can be recovered. That is, the protrusion 81 can move into the second limiting hole 42 in the third direction z. Then, the fixing rod 2 can be rotated about the protrusion 81 located in the second limiting hole 42, so as to switch the rollable display device to be in the second state.

In an example, as shown in FIG. 19, the fixing rod 2 includes a first end 21 close to the third limiting hole 43. A distance from the third limiting hole 43 to the first end 21 of the fixing portion is referred as a first distance D1. As shown in FIG. 12, in the first state, a shortest distance between an inner wall of the receiving portion 3 and an outer wall of the fixing rod 2 is referred as a second distance D2. Here, the inner wall of the receiving portion 3 is an inner wall of the receiving portion 3 corresponding to a position of the notch 5 in the second direction y. The first distance D1 is smaller than or equal to the second distance D2, so that the receiving portion 3 does not block rotation of the fixing rod 2 when rotating and adjusting an extending direction of the fixing rod 2. This can achieve normal rotation of the fixing rod 2.

Figure 28:
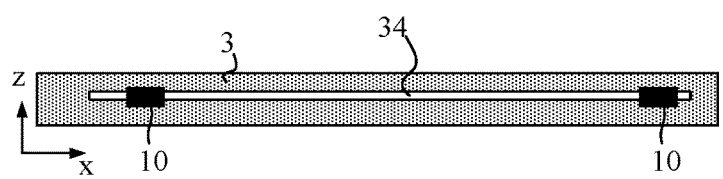
FIG. 28 is a side view of FIG. 1.
Figure 29:
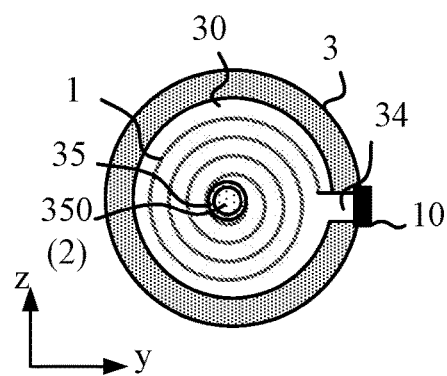
FIG. 29 is a top view of FIG. 1.

In an example, as shown in FIG. 1 and FIG. 2, the rollable display device described above further includes a stopper 10 that is connected to the edge of the flexible display panel 1. FIG. 28 is a side view of FIG. 1. FIG. 29 is a top view of FIG. 1. As shown in FIG. 28 and FIG. 29, the receiving portion 3 further includes an opening 34 communicating with the cavity 30, and the opening 34 is used as an inlet for the flexible display panel 1 entering the receiving portion 3 and an outlet for the flexible display panel 1 moving out of the receiving portion 3. The stopper 10 is configured to prevent the flexible display panel 1 from completely entering the cavity 30 of the receiving portion 3, thereby avoiding that the flexible display panel cannot be unrolled when the flexible display panel is switched from the first state to the second state.

As shown in FIG. 1 and FIG. 2, in the first direction x, a length of the cavity 30 of the receiving portion 3 is larger than or equal to a maximum width of the flexible display panel 1 in the first direction x, so that the flexible display panel 1 can be completely received into the receiving portion 3.

With further reference to FIG. 29, the receiving portion 3 described above includes a roller shaft 35 located in the cavity 30 of the receiving portion 3, and the roller shaft 35 is located in the cavity 30 of the receiving portion 3 and penetrates the receiving portion 3. The cavity 30, the roller shaft 35, and the receiving portion 3 each extend in the first direction x.

When receiving the flexible display panel 1 into the receiving portion 3, the roller shaft 35 is rotated in a certain direction to drive the flexible display panel 1 located outside the receiving portion 3 to move into the receiving portion 3 along the direction −y.

In an embodiment, a cavity 350 may be further arranged in the roller shaft 35 and penetrates the roller shaft 35, and the cavity 350 of the roller shaft 35 extends along the first direction. In the first state, the fixing rod 2 is received into the cavity 350 of the roller shaft 35, so as to further reduce the volume of the rollable display device in the first state.

In an example, the fixing portion includes the above-mentioned fixing rod 2 and a buckle structure or a magnet arranged on the fixing rod 2. In the second state, the buckle structure or the magnet can connect the flexible display panel 1 with the fixing rod 2.

The flexible display panel 1 described above may be designed as various shapes. For example, the flexible display panel 1 may be designed as a quadrangle shape as shown in FIG. 2, or the flexible display panel 1 may be designed as a pentagonal shape or the like. When arranging the fixing rods 2, at least a part of the fixing rods 2 can support a plurality of edges of the flexible display panel 1 in one-to-one correspondence in the second state. That is, each fixing rod 2 corresponds to one edge of the flexible display panel 1, thereby improving the stability of the flexible display panel 1 in the second state.

For example, in an embodiment of the present disclosure, in the second state, at least a part of adjacent fixing rods 2 include ends that are hinged or jointed to each other. By jointing or hinging, assembly and disassembly of adjacent fixing rods 2 can be more convenient, so that the rollable display device can be switched between the first state and the second state more conveniently and quickly. In an example, the fixing rod 2 close to the receiving portion 3 can also be connected to the receiving portion 3 by jointing or hinging. It should be noted that, the ends of adjacent fixing rods are hinged or jointed to each other, so that the entire fixing portion is formed as a whole structure by connecting respective fixing rods to each other. Meanwhile, each fixing rod supports a respective edge of the flexible display panel in one-to-one correspondence. In other words, the entire fixing portion is an integrated structure configured to fix a plurality of edges of the flexible display panel.

It should be noted that the above description is an example of a structure that can allow the receiving portion and the fixing rod connected thereto to be rotated and contracted with respect to each other. In fact, any two adjacent fixing rods of the fixing portion may also be provided with the above-mentioned structure in which one can be received into the other one by contraction, so as to allow one of the fixing rods to be received into the other fixing rod by a same rotation and contraction manner.

In an embodiment, a number of fixing rods 2 may be smaller than a number of edges of the flexible display panel 1. For example, the flexible display panel 1 includes N edges, and one of the N edges may be fixed by the receiving portion 2. The remaining (N−1) edges may be fixed by M fixing rods, where M<N−1. For example, one or more adjacent edges of the flexible display panel may not be provided with corresponding fixing rods, and the one or more adjacent edges may be supported by the effect of the remaining fixing rods 2 supporting the corresponding edges.

The M fixing rods may be further divided into two parts that are not connected to each other. One part of fixing rods may be sequentially connected to each other starting from the first end of the receiving portion 3, and the other one part of the two parts of fixing rods may be sequentially connected to each other starting from the second end 32 of the receiving portion 3.

In an example, the flexible display panel 1 may include a $1^{st}$ edge to an $N^{th}$ edge that are sequentially connected to each other and not collinear. In this case, the fixing portion may include a first fixing rod jointed or hinged to the first end 31 of the receiving portion 3, and a second fixing rod jointed or hinged to the second end 32 of the receiving portion 3. The first fixing rod is not connected to the second fixing rod. In this way, during a receiving process, the first fixing rod and the second fixing rod can be rotated along opposite directions into the same extending direction as the receiving portion, and then the first fixing rod and the second fixing rod can respectively slide into the receiving portion.

For example, the receiving portion is connected to the $N^{th}$ edge of the flexible display panel, and an edge that is not adjacent to the $N^{th}$ edge is not provided with a fixing rod for fixing connection. That is, the number of fixing rods is N−2. In this case, the number of first fixing rods may be M, and the number of second fixing rods may be (N−M−2). Here, the first fixing rods may include a first one to an $M^{th}$ one that are sequentially hinged or jointed to each other. The second fixing rods may include a $1^{st}$ one to a $(N-M-2)^{th}$ one that are sequentially hinged or jointed to each other. The first one of the first fixing rod 211 is rotatably connected to the first end 31 of the receiving portion 3, and the $(N-M-2)^{th}$ one of the (N−M−2) second fixing rods is rotatably connected to the second end 32 of the receiving portion 3.

In the first state, the M first fixing rods and the (N−M−2) second fixing rods are all located in the cavity 30 of the receiving portion 3.

In the second state, the receiving portion 3 is connected to the $N^{th}$ edge of the flexible display panel. The M first fixing rods are connected to the $1^{st}$ edge to the $M^{th}$ edge of the flexible display panel in one-to-one correspondence. The (N−M−2) second fixing rods are connected the $(M+2)^{th}$ edge to the $(N-1)^{th}$ edge of the flexible display panel in one-to-one correspondence. Here, (N−M)≥3, and N is an integer larger than or equal to 4.

As shown in FIG. 2, the flexible display panel includes 4 edges, i.e., N=4, and the rollable display device is in the second state. It can be seen from FIG. 2 that M=1, i.e., the fixing rod includes one first fixing rod 211 and one second fixing rod 221. The first fixing rod 211 is jointed or hinged to the first end 31 of the receiving portion 3, and the two can rotate relative to each other with a connection position as a rotation axis. The second fixing rod 221 is jointed or hinged to the second end 32 of the receiving portion 3, and the two can rotate relative to each other with a connection position as a rotation axis.

As shown in FIG. 2, in the second state, the first fixing rod 211 is connected to a first edge 11 of the flexible display panel 1, the second fixing rod 221 is connected to a third edge 13 of the flexible display panel 1, and the receiving portion 3 is connected to a fourth edge 14 of the flexible display panel 1. That is, for the flexible display panel 1, a second edge 12 opposite to the receiving portion 3 is not provided with a fixing rod for fixing. In this case, since two ends of the second edge 12 are fixed via the first fixing rod 211 and the second fixing rod 221, the stability of the flexible display panel 1 in the second state can still be achieved.

In the first state, both the first fixing rod 211 and the second fixing rod 221 are located in the cavity of the receiving portion 3. When the rollable display device completes displaying, the first the fixing rod 211 can be rotated counterclockwise with a position where it is connected to the receiving portion 3 as a rotation axis, until an extending direction of the first fixing rod 211 is the same as the extending direction of the receiving portion. Then, the first fixing rod 211 is slid into the cavity 30 of the receiving portion 3 in the method described above. By the same token, the second fixing rod 221 can be rotated clockwise with a position where it is connected to the receiving portion 3 as a rotation axis, until an extending direction of the second fixing rod 221 is the same as the extending direction of the receiving portion 3. Then, the second fixing rod 221 can also be slid into the cavity 30 of the receiving portion 3 in the method described above.

In an embodiment, at least one of the M first fixing rods includes a $1^{st}$ fixing sub-rod and a $2^{nd}$ fixing sub-rod connected to each other. That is, one edge of the flexible display panel 1 is provided with a plurality of fixing sub-rods connected to each other. A cavity is arranged in the fixing sub-rod, and the cavities of different fixing sub-rods have different radial dimensions. For example, the closer the fixing sub-rod is to the receiving portion, the larger the radial dimension of the cavity of the fixing sub-rod is. In this case, when sequentially receiving a plurality of fixing rods into the receiving portion, the plurality of fixing sub-rods may be sequentially received into the fixing sub-rod that is adjacent to the plurality of fixing sub-rods and close to the receiving portion, and then the fixing sub-rod connected to the receiving portion is received into the receiving portion 3 by being sequentially rotated and slid.

Figure 30:
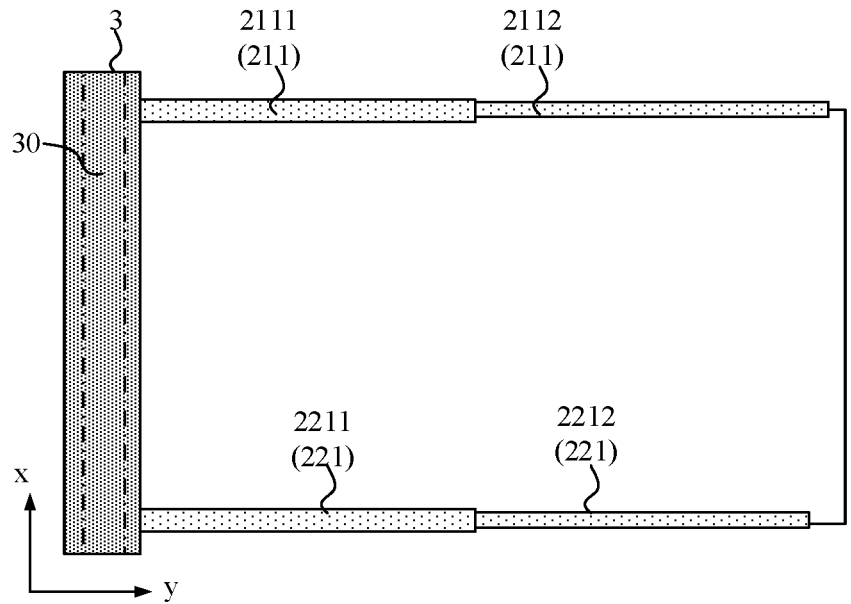
FIG. 30 is a schematic top view of another rollable display device in the second state according to an embodiment of the present disclosure.

FIG. 30 is a schematic top view of another rollable display device in a second state according to an embodiment of the present disclosure. In an example, as shown in FIG. 30, the first fixing rod 211 include described above includes a first fixing sub-rod 2111 and a second fixing sub-rod 2112, and the first fixing sub-rod 2111 includes a cavity. An inner diameter of the first fixing sub-rod 2111 is larger than an outer diameter of the second fixing sub-rod 2112, so that the second fixing sub-rod 2112 can slide and contract into the cavity of the first fixing sub-rod 2111. In this way, when the rollable display device is switched from the second state to the first state, firstly the second fixing sub-rod 2112 can be slid into the cavity of the first fixing sub-rod 2111, and then the first fixing sub-rod 2111 can be received into the receiving portion 3 by being sequentially rotated and slid.

By the same token, the (N−M−2) second fixing rods may include a third fixing sub-rod and a fourth fixing sub-rod, the third fixing sub-rod includes a cavity, and an inner diameter of the third fixing sub-rod is larger than an outer diameter of the fourth fixing sub-rod, so that the fourth fixing sub-rod can slide and contract into the cavity of the third fixing sub-rod. As shown in FIG. 30, the second fixing rod 221 includes a third fixing sub-rod 2211 and a fourth fixing sub-rod 2212. When the rollable display device is switched from the second state to the first state, firstly the fourth fixing sub-rod 2212 may be slid into the cavity of the third fixing sub-rod 2211, and then the third fixing sub-rod 2211 can be received into the receiving portion 3 by being sequentially rotated and slid.

It should be understood that, in this embodiment of the present disclosure, it is possible that only the M first fixing rods include a plurality of fixing sub-rods, it is also possible that only the (N−M−2) second fixing rods include a plurality of fixing sub-rods, and it is also possible that the M first fixing rods include fixing sub-rods and the (N−M−2) second fixing rods include fixing sub-rods. These schemes described above will fall within the scope of the present disclosure.

Alternatively, in an embodiment of the present disclosure, when the flexible display panel 1 includes 6 or more edges, i.e., N≥6, a cavity is provided in each of the $1^{st}$ one to the $(M−1)^{th}$ one of the M first fixing rods connected to different edges of the flexible display panel, and the cavity of an $i^{th}$ one of the M first fixing rods extends in the same direction as an extending direction of the $i^{th}$ one of the M first fixing rods and penetrates the $i^{th}$ one of the M first fixing rods. Similarly, a cavity is provided in each of the second one to the $(N−M−2)^{th}$ one of the (N−M−2) second fixing rods connected to different edges of the flexible display panel, and the cavity of a $j^{th}$ one of the (N−M−2) second fixing rods extends in the same direction as an extending direction of the $j^{th}$ one of the (N−M−2) second fixing rods and penetrates the $j^{th}$ one of the (N−M−2) second fixing rods.

In addition, in an embodiment of the present disclosure, two adjacent ones of the M first fixing rods and two adjacent ones of the (N−M−2) second fixing rods are provided with a structure including a first limiting hole 41, a second limiting hole 42, a third limiting hole 43, a notch 5, a sliding groove 6, a spring 7 and a fixing shaft 8. For example, when the second one of the M first fixing rods is received into the first one of the M first fixing rods, the first one of the M first fixing rods may be provided with the first limiting hole 41, the second limiting hole 42, the notch 5 and the sliding groove 6, and the second one of the M first fixing rods may be provided with the third limiting hole 43, the spring 7 and the fixing shaft 8. In this case, when the rollable display device is switched from the second state to the first state, one of two adjacent ones of the M first fixing rods or two adjacent ones of the (N−M−2) second fixing rods can be received into the cavity of the other one fixing rod by being sequentially rotated and slid as described above. In the first state, an $(i+1)^{th}$ one of the M first fixing rods is received into the cavity of the $i^{th}$ one of the M first fixing rods, where i=1, 2, . . . , (M−2), (M−1). The first one of the M first fixing rods is received into the cavity 30 of the receiving portion 3. Therefore, in the first state, a final total volume of all first fixing rods is a volume of the first one of the M first fixing rods, so that the cavity 30 of the receiving portion 3 can be smaller, thereby further reducing a total volume of the rollable display device in the first state. By the same token, in the first state, a $j^{th}$ one of the (N−M−2) second fixing rods is received into the cavity of a $(j+1)^{th}$ one of the (N−M−2) second fixing rods, where j=1, 2, . . . , (N−M−4), (N−M−3). The $(N−M−2)^{th}$ one of the (N−M−2) second fixing rods is received into the cavity 30 of the receiving portion 3, so that in the first state, a final total volume of all second fixing rods is a volume of the $(N−M−2)^{th}$ one of the (N−M−2) second fixing rods, thereby reducing the total volume of the rollable display device in the first state.

The receiving portion, the first fixing rod and the second fixing rod described above can be designed as various shapes. For example, the receiving portion and the $(N−M−2)^{th}$ one of the (N−M−2) second fixing rods may be designed as a hollow cylinder, and an outer diameter of the first one of the M first fixing rods is smaller than the inner diameter of the $(N−M−2)^{th}$ one of the (N−M−2) second fixing rods. In this way, in the first state, the first one of the M first fixing rods into which the second one to the $M^{th}$ one of the M first fixing rods are received can be received into the $(N−M−2)^{th}$ one of the (N−M−2) second fixing rods, and then the $(N−M−2)^{th}$ one of the (N−M−2) second fixing rods can be received into the cavity of the receiving portion.

Figure 31:
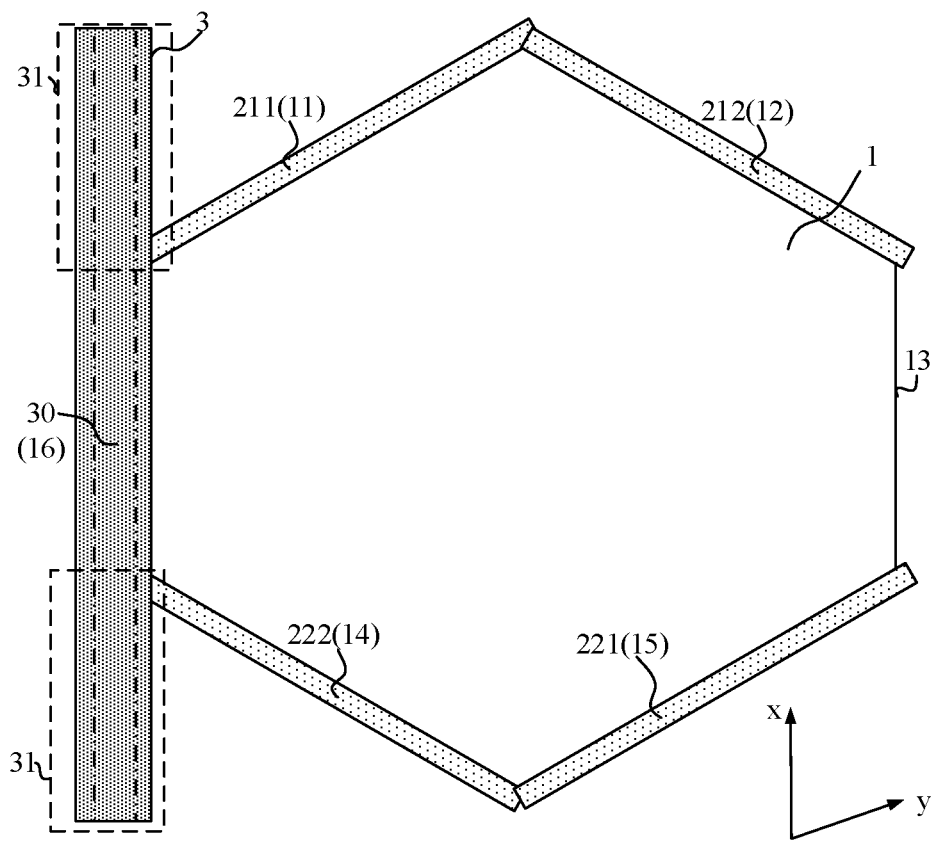
FIG. 31 is a schematic top view of still another rollable display device in the second state according to an embodiment of the present disclosure.

FIG. 31 is a schematic top view of still another rollable display device in a second state according to an embodiment of the present disclosure. In an example, as shown in FIG. 31, N=6 and M=2. That is, the fixing portion includes two first fixing rods 211 and 212 that are sequentially jointed or hinged, and the first fixing rod 211 is hinged or jointed to the first end 31 of the receiving portion 3. The fixing portion further includes two second fixing rods 221 and 222 that are sequentially hinged or jointed, and the second fixing rod 222 is jointed or hinged to the second end 32 of the receiving portion 3.

In the second state, the first fixing rods 211 and 212 are respectively connected to the first edge 11 and the second edge 12 of the flexible display panel 1 in one-to-one correspondence, and the second fixing rods 221 and 222 are respectively connected to the fourth edge 14 and a fifth edge 15 of the flexible display panel 1 in one-to-one correspondence. The receiving portion 3 is correspondingly connected to a sixth edge 16 of the flexible display panel. That is, for the flexible display panel 1, the third edge 13 opposite to the receiving portion 3 is not provided with a fixing rod for fixing. In this case, since two ends of the third edge 13 are fixed via the first fixing rod 212 and the second fixing rod 221, the stability of the flexible display panel 1 in the second state can still be achieved.

In this embodiment of the present disclosure, the cavity (not shown) is provided in the first the fixing rod 211, and the first fixing rods 211 and 212 are correspondingly provided with the structure described above including the first limiting hole 41, the second limiting hole 42, the third limiting hole 43, the notch 5, the sliding groove 6, the spring 7 and the fixing shaft 8. In this way, when the rollable display device is switched from the second state to the first state, the first fixing rod 212 can be received into the cavity of the first fixing rod 211 by being sequentially rotated and slid as described above. Then, the first fixing rod 211 into which the first fixing rod 212 is received is received into the cavity 30 of the receiving portion 3 by being sequentially rotated and slid as described above.

By the same token, in an embodiment of the present disclosure, the cavity (not shown) is provided in the second fixing rod 222, and the second fixing rods 221 and 222 are provided with the structure described above including the first limiting hole 41, the second limiting hole 42, the third limiting hole 43, the notch 5, the sliding groove 6, the spring 7 and the fixing shaft 8. In this way, the second fixing rod 221 can be received into the cavity of the second fixing rod 222 by being sequentially rotated and slid as described above. Then, the second fixing rod 222 into which the second fixing rod 221 is received can be received into the cavity 30 of the receiving portion 3 by being sequentially rotated and slid as described above.

The above description is an example of a structure of the rollable display device according to an embodiment of the present disclosure in which the number of fixing rods is smaller than the number of edges of the flexible display panel. It should be noted that each edge of the flexible display panel may also be provided with a fixing rod for fixing or a receiving portion.

In an example, the flexible display panel includes a $1^{st}$ edge to an $N^{th}$ edge that are sequentially connected and not collinear. In this case, in an embodiment of the present disclosure, the fixing portion may include a $1^{st}$ fixing rod to a $(N-1)^{th}$ fixing rod that are sequentially hinged or jointed. The $1^{st}$ fixing rod to the $(N-2)^{th}$ fixing rod each include a cavity. N is an integer larger than or equal to 3.

In the first state, the $1^{st}$ fixing rod to the $(N-1)^{th}$ fixing rod are all located in the cavity of the receiving portion.

In the second state, the receiving portion is connected to the $N^{th}$ edge, and the $1^{st}$ fixing rod to the $(N-1)^{th}$ fixing rod are connected to the $1^{st}$ edge to the $(N-1)^{th}$ edge in one-to-one correspondence. A first end of the $1^{st}$ fixing rod is connected to the first end of the receiving portion, and a second end of the $(N-1)^{th}$ fixing rod is connected to the second end of the receiving portion by a buckle structure.

In an example, the receiving portion 3, the $1^{st}$ fixing rod 61 to the $(N-2)^{th}$ fixing rod may also be designed as a hollow cylinder; an outer diameter of a $(i+1)^{th}$ fixing rod is smaller than an inner diameter of an $i^{th}$ fixing rod, and an outer diameter of the $1^{st}$ fixing rod 61 is smaller than an inner diameter of the receiving portion 3. In the first state, the $(i+1)^{th}$ fixing rod is located in the cavity of the $i^{th}$ fixing rod, and the $1^{st}$ fixing rod 61 is located in the cavity 30 of the receiving portion 3. Here, $1 \leq i \leq N-2$. In this case, if a volume of the cavity 30 of the receiving portion 3 is slightly larger than a volume of the $1^{st}$ fixing rod 61, then a plurality of fixing rods described above can be received. In this way, the cavity 30 of the receiving portion 3 will not be extremely large, thereby reducing the volume of the receiving portion 3 and further reducing a space occupied by the rollable display device in the second state.

In an embodiment of the present disclosure, two adjacent fixing rods are provided with a structure including a first limiting hole 41, a second limiting hole 42, a third limiting hole 43, a notch 5, a sliding groove 6, a spring 7 and a fixing shaft 8. For example, when the $2^{nd}$ fixing rod is received into the $1^{st}$ fixing rod, the $1^{st}$ fixing rod may be provided with the first limiting hole 41, the second limiting hole 42, the notch 5 and the sliding groove 6, and the $2^{nd}$ fixing rod may be provided with the third limiting hole 43, the spring 7 and the fixing shaft 8. In this case, when the rollable display device is switched from the second state to the first state, one of two adjacent fixing rods can be received into the cavity of the other one fixing rod by being sequentially rotated and slid as described above.

Figure 32:
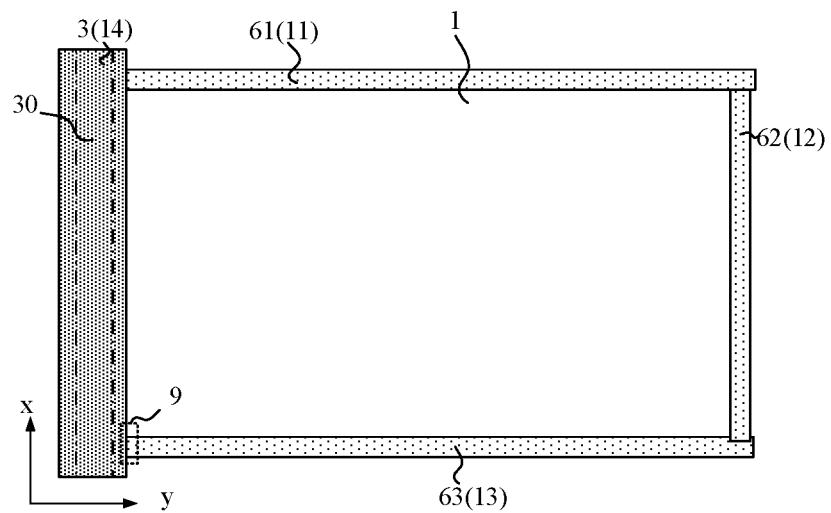
FIG. 32 is a schematic top view of yet another rollable display device in the second state according to an embodiment of the present disclosure.

When the rollable display device is switched from the second state to the first state, an external force may be firstly applied to the buckle structure so as to separate the $(N-1)^{th}$ fixing rod from the receiving portion, and then each fixing rod, starting from the $(N-1)^{th}$ fixing rod, is received by being sequentially rotated and slid as described above, FIG. 32 is a schematic top view of yet another rollable display device in a second state according to an embodiment of the present disclosure. In an example, as shown in FIG. 32, N=4. That is, the flexible display panel 1 includes a $1^{st}$ edge 11, a $2^{nd}$ edge 12, a $3^{rd}$ edge 13, and a $4^{th}$ edge 14 that are sequentially connected and are not collinear. The fixing portion includes a $1^{st}$ fixing rod 61, a $2^{nd}$ fixing rod 62, and a $3^{rd}$ fixing rod 63 that are sequentially hinged or jointed. The $1^{st}$ fixing rod 61 and the $2^{nd}$ fixing rod 62 each include a cavity (not shown).

In the second state, the receiving portion 3 is connected to the $4^{th}$ edge 14, the $1^{st}$ fixing rod 61 is connected to the $1^{st}$ edge 11, the $2^{nd}$ fixing rod 62 is connected to the $2^{nd}$ edge 12, and the $3^{rd}$ fixing rod 63 is connected to the $3^{rd}$ edge 13. The first end 31 of the receiving portion 3 is connected to a first end of the 1st fixing rod 61, a second end of the $1^{st}$ fixing rod 61 is connected to a first end of the $2^{nd}$ fixing rod 62, a second end of the $2^{nd}$ fixing rod 62 is connected to a first end of the $3^{rd}$ fixing rod 63, and a second end of the $3^{rd}$ fixing rod 63 is connected to the second end 32 of the receiving portion 3 by the buckle structure 9.

In an example, two adjacent fixing rods may be cooperatively provided with the structure described above including the first limiting hole 41, the second limiting hole 42, the third limiting hole 43, the notch 5, the sliding groove 6, the spring 7 and the fixing shaft 8. For example, when the $3^{rd}$ fixing rod is received into the $2^{nd}$ fixing rod, the $2^{nd}$ fixing rod may be provided with the first limiting hole 41, the second limiting hole 42, the notch 5, and the sliding groove 6, and the $3^{rd}$ fixing rod may be provided with the third limiting hole 43, the spring 7 and the fixing shaft 8. In this case, when the rollable display device is switched from the second state to the first state, firstly an external force is applied to the buckle structure to separate the second end of the $3^{rd}$ fixing rod 63 from the second end 32 of the receiving portion 3, and then the $3^{rd}$ fixing rod 63 is received into the cavity of the $2^{nd}$ fixing rod 62 by being sequentially rotated and slid as described above. Then, the $2^{nd}$ fixing rod 62 and the $1^{st}$ fixing rod 6 are sequentially received.

In an example, the buckle structure described above includes a protrusion and a limiting groove. The protrusion portion and the limiting groove are respectively arranged at the $(N-1)^{th}$ fixing rod and the receiving portion connected by the buckle structure. For example, the protrusion portion may be arranged at the $(N-1)^{th}$ fixing rod, and the limiting groove may be arranged at the receiving portion. Alternatively, the protrusion portion may be arranged at the receiving portion, and the limiting groove may be arranged at the $(N-1)^{th}$ fixing rod.

The second end of the $(N-1)^{th}$ fixing rod and the second end of the receiving portion each include a top wall and a side wall connected to and surrounding the top wall.

Figure 33:
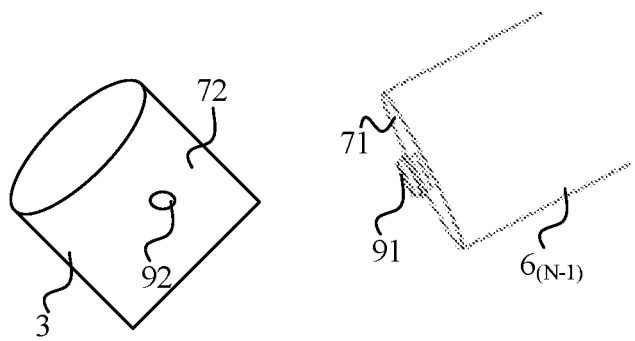
FIG. 33 is a schematic diagram of a buckle structure according to an embodiment of the present disclosure.

FIG. 33 is a schematic diagram of a buckle structure according to an embodiment of the present disclosure. As shown in FIG. 33, when the protrusion portion is arranged at the $(N-1)^{th}$ fixing rod, the protrusion portion 91 may be arranged at a top wall 71 of the $(N-1)^{th}$ fixing rod $6_{(N-1)}$, and the protrusion portion 91 may extend from the top wall 71 in a direction facing away from the $(N-1)^{th}$ fixing rod $6_{(N-1)}$. The limiting groove 92 may be arranged at the side wall 72 of the receiving portion 3, and the limiting groove 92 extends from the side wall 72 of the receiving portion 3 towards the receiving portion 3. When the protrusion portion 91 is embedded into the limiting groove 92, the receiving portion 3 can be connected to the $(N-1)^{th}$ fixing rod $6_{(N-1)}$. When the receiving portion 3 needs to be separated from the $(N-1)^{th}$ fixing rod $6_{(N-1)}$, the protrusion portion 91 can be moved out of the limiting groove 92. In an example, the protrusion portion 91 can be arranged in the limiting groove 92 in an interference fit manner, thereby improving stability of the buckle structure.

Alternatively, the protrusion portion may be arranged at the receiving portion. Similar to a case where the limiting groove is arranged at the $(N-1)^{th}$ fixing rod, that is, the protrusion portion is arranged at the top wall of the receiving portion, and the protrusion portion extends from the top wall of the receiving portion in a direction facing away from the receiving portion. The limiting groove is arranged at the side wall of the $(N-1)^{th}$ fixing rod, and the limiting groove extends from the side wall of the $(N-1)^{th}$ fixing rod towards the $(N-1)^{th}$ fixing rod.

Figure 34:
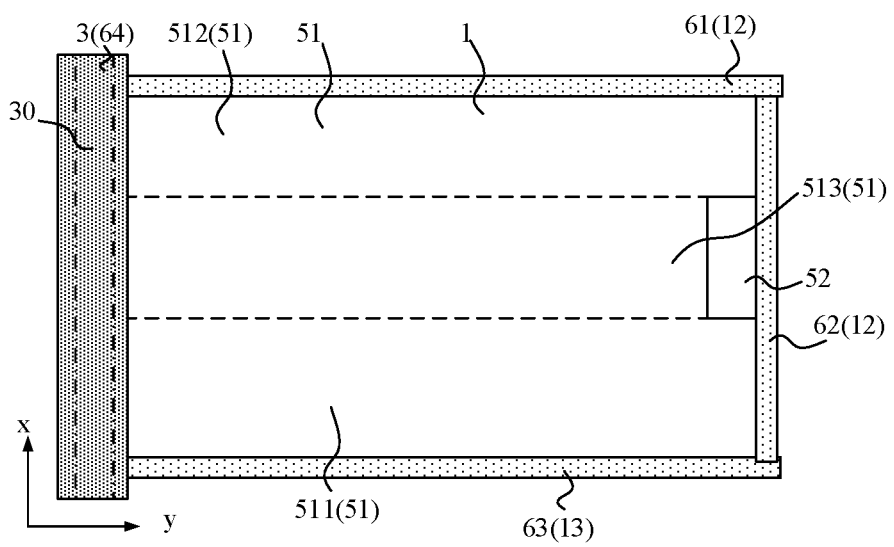
FIG. 34 is a schematic top view of yet another rollable display device in the second state according to an embodiment of the present disclosure.

FIG. 34 is a schematic top view of yet another rollable display device in the second state according to an embodiment of the present disclosure. In an embodiment, as shown in FIG. 34, the flexible display panel 1 includes 4 edges, i.e., N=4. The flexible display panel 1 further includes a display area 51 and a light transmission area 52. The display area 51 includes a first display area 511, a third display area 513, and a second display area 512 arranged along the first direction x. The light transmission area 52 and the third display area 513 are arranged along the second direction y. In the first direction x, the third display area 513 and the light transmission area 52 are located between the first display area 511 and the second display area 512. In the second direction y, a length of the third display area 513 is smaller than a length of the first display area 511 and smaller than a length of the second display area 512, so that a side notch (notch) area can be formed in the flexible display panel. Thus, functional components such as a camera, an iris sensor, and an earpiece can be subsequently installed in this area to enrich the use function of the flexible display panel. Moreover, with such a configuration provided by this embodiment of the present disclosure, in addition to enriching the use function of the flexible display panel, the functional components described above do not have to be arranged in a bezel area of the flexible display panel. In this way, the bezel area can have a reduced size, thereby facilitating achieving a narrow bezel for the flexible display panel.

It should be noted that the shape of the light transmission area 52 is not limited in the embodiments of the present disclosure. For example, the shape of the light transmission area 52 may be any shape, such as a circular shape, an elliptical shape, or a polygonal shape.

On the basis of forming the side notch (notch) area in the light transmission area 52, an embodiment of the present disclosure may provide a buckle structure or a magnet on the $2^{nd}$ fixing rod 62. In this way, in the second state, the flexible display panel 1 can be fixed by the buckle structure or magnet located at the $2^{nd}$ fixing rod 62 being connected to an edge of the light transmission area 52.

The above-described embodiments are embodiments of the present disclosure and are not intended to limit the present disclosure. Any modifications, equivalent substitutions and improvements made within the principle of the present disclosure shall fall into the protection scope of the present disclosure.

What is claimed is:

1. A rollable display device, comprising:
    a flexible display panel comprising a plurality of edges;
    a fixing portion comprising a plurality of fixing rods for fixing the plurality of edges of the flexible display panel when the flexible display panel is in a second state; and
    a receiving portion comprising a cavity,
    wherein in a first state, the flexible display panel is rolled and received into the cavity of the receiving portion with a first direction as an axis, the plurality of fixing rods extends in the first direction and is received into the cavity of the receiving portion, and each of the plurality of fixing rods is capable of moving in the first direction or a direction opposite to the first direction to move out of the cavity of the receiving portion;
    wherein in the second state, the flexible display panel is at least partially unrolled outside the receiving portion, the plurality of fixing rods is located outside the cavity to support the flexible display panel, and at least a part of at least one fixing rod of the plurality of fixing rods extends in a second direction; and
    wherein the first direction intersects with the second direction.

2. The rollable display device according to claim 1, wherein in the second state, at least a part of the plurality of fixing rods supports the plurality of edges of the flexible display panel in one-to-one correspondence.

3. The rollable display device according to claim 2, wherein in the second state, at least a part of adjacent fixing rods of the plurality of fixing rods has ends that are hinged or jointed to each other.

4. The rollable display device according to claim 1, wherein the rollable display device further comprises a stopper connected to an edge of the flexible display panel and configured to prevent the flexible display panel from completely entering the receiving portion.

5. The rollable display device according to claim 1, wherein
    the fixing portion comprises a third buckle structure or a magnet provided on the fixing rod; and
    in the second state, the flexible display panel is connected to the fixing rod by the third buckle structure or the magnet.

6. The rollable display device according to claim 1, wherein the receiving portion comprises a roller shaft located in the cavity of the receiving portion, and the cavity of the receiving portion penetrates the receiving portion, and an extending direction of the cavity of the receiving portion and an extending direction of the roller shaft are both the same as an extending direction of the receiving portion;
    in the first state, the flexible display panel is wound about the roller shaft; the roller shaft comprises a cavity, and the cavity of the roller shaft penetrates the roller shaft and extends in a same direction as the extending direction of the roller shaft; and in the first state, the fixing rod is located in the cavity of the roller shaft.

7. The rollable display device according to claim 1, wherein
    the receiving portion comprises a first end comprising a first limiting hole, and a second end comprising a second limiting hole and a notch; the receiving portion further comprises a sliding groove located between the first limiting hole and the second limiting hole and connected to the first limiting hole and the second limiting hole; the first limiting hole, the second limiting hole, and the sliding groove each extend from the cavity of the receiving portion towards a side wall of the receiving portion; and a depth of the sliding groove is smaller than a depth of the first limiting hole and smaller than a depth of the second limiting hole in a direction perpendicular to an extending direction of the receiving portion;

one fixing rod of the plurality of fixing rods comprises a third limiting hole extending from an outer surface of the one fixing rod towards an interior of the fixing rod; a spring is provided in the third limiting hole; the one fixing rod further comprises a fixing shaft connected to the spring, and an extending direction of the fixing shaft is the same as an extending direction of the third limiting hole;

in the first state, the first limiting hole overlaps the third limiting hole overlap, and the fixing shaft and the spring are located in the first limiting hole and the third limiting hole;

in the second state, the second limiting hole overlaps the third limiting hole, and the fixing shaft and the spring are located in the second limiting hole and the third limiting hole; and the one fixing rod extends in the second direction from the notch and extends out of the receiving portion; and in a third state, the fixing shaft and the spring are located in the sliding groove, and an elastic deformation of the spring is larger than that in the first state and in the second state.

8. The rollable display device according to claim 7, wherein
the one fixing rod comprises a first end close to the third limiting hole; a distance from the third limiting hole to the first end of the one fixing portion is a first distance;
in the first state, a shortest distance between an inner wall of the receiving portion and an outer wall of the one fixing rod is a second distance; and the inner wall of the receiving portion corresponds to a position of the notch in the second direction; and
the first distance is smaller than or equal to the second distance.

9. The rollable display device according to claim 7, wherein
the first limiting hole and the second limiting hole penetrate the side wall of the receiving portion.

10. The rollable display device according to claim 9, wherein a volume of the cavity of the receiving portion is larger than a volume of a first fixing rod of the plurality of fixing rods.

11. A rollable display device, comprising:
a flexible display panel comprising a plurality of edges, wherein the plurality of edges comprises a $1^{st}$ edge to an $N^{th}$ edge that are sequentially connected and are not collinear;
a fixing portion comprising a plurality of fixing rods for fixing the plurality of edges of the flexible display panel when the flexible display panel is in a second state, wherein the plurality of fixing rods comprises M first fixing rods comprising a first one to an $M^{th}$ one that are sequentially hinged or jointed, and (N−M−2) second fixing rods comprising a first one to a (N−M−2)$^{th}$ one that are sequentially hinged or jointed; the first one of the M first fixing rods is rotatably connected to a first end of the receiving portion, and the (N−M−2)$^{th}$ one of the (N−M−2) second fixing rods is rotatably connected to a second end of the receiving portion, where N−M>3 and N is an integer larger than or equal to 4; and
a receiving portion comprising a cavity,
wherein in the second state, the flexible display panel is at least partially unrolled outside the receiving portion, the M first fixing rods and the (N−M−2) second fixing rods are located outside the cavity to support the flexible display panel, and at least a part of at least one first fixing rod of the M first fixing rods or the (N−M−2) second fixing rods extends in a second direction, wherein the receiving portion is connected to the $N^{th}$ edge, and the M first fixing rods are connected to the $1^{st}$ edge to an $M^{th}$ edge in one-to-one correspondence, and the (N−M−2) second fixing rods are connected to an (M+2)$^{th}$ edge to a (N−1)$^{th}$ edge in one-to-one correspondence,
wherein in a first state, the flexible display panel is rolled and received into the cavity of the receiving portion with a first direction as an axis, and the M first fixing rods and the (N−M−2) second fixing rods are all located in the cavity of the receiving portion,
wherein the first direction intersects with the second direction.

12. The rollable display device according to claim 11, wherein
at least one of the M first fixing rods comprises a $1^{st}$ fixing sub-rod and a $2^{nd}$ fixing sub-rod connected to each other;
the $1^{st}$ fixing sub-rod comprises a cavity, and an inner diameter of the $1^{st}$ fixing sub-rod is larger than an outer diameter of the $2^{nd}$ fixing sub-rod; and
the $2^{nd}$ fixing sub-rod is configured to slide and contract into the cavity of the $1^{st}$ fixing sub-rod.

13. The rollable display device according to claim 11, wherein
the (N−M−2) second fixing rods comprise a $3^{rd}$ fixing sub-rod and a $4^{th}$ fixing sub-rod connected to each other;
the $3^{rd}$ fixing sub-rod comprises a cavity, and an inner diameter of the $3^{rd}$ fixing sub-rod is larger than an outer diameter of the $4^{th}$ fixing sub-rod; and
the $4^{th}$ fixing sub-rod is configured to slide and contract into the cavity of the $3^{rd}$ fixing sub-rod.

14. The rollable display device according to claim 11, wherein
each of the M first fixing rods comprises a cavity, and the cavity of an $i^{th}$ one of the M first fixing rods penetrates the $i^{th}$ one of the M first fixing rods and extends in a same direction as an extending direction of the $i^{th}$ one of the M first fixing rods; and each of the (N−M−2) second fixing rods comprises a cavity, and the cavity of a $j^{th}$ one of the (N−M−2) second fixing rods penetrates the $j^{th}$ one of the (N−M−2) second fixing rods and extends in a same direction as an extending direction of the $j^{th}$ one of the (N−M−2) second fixing rods; and
in the first state, an (i+1)$^{th}$ one of the M first fixing rods is located in the $i^{th}$ one of the M first fixing rods, and the first one of the M first fixing rods is located in the cavity of the receiving portion; the $j^{th}$ one of the (N−M−2) second fixing rods is located in the cavity of a (j+1)$^{th}$ one of the (N−M−2) second fixing rods, and the (N−M−2)$^{th}$ one of the (N−M−2) second fixing rods is located in the cavity of the receiving portion;
wherein N is an integer larger than or equal to 6;

$i=1,2,\ldots,(M-2),(M-1)$; and $j=1,2,\ldots,(N-M-4),(N-M-3)$.

15. The rollable display device according to claim 11, wherein
- a shape of the receiving portion and a shape of the $(N-M-2)^{th}$ one of the $(N-M-2)$ second fixing rods each comprise a hollow cylinder;
- an outer diameter of the first one of the M first fixing rods is smaller than an inner diameter of the $(N-M-2)^{th}$ one of the $(N-M-2)$ second fixing rods, and an outer diameter of the $(N-M-2)^{th}$ one of the $(N-M-2)$ second fixing rods is smaller than an inner diameter of the receiving portion; and
- in the first state, the first one of the M first fixing rods is located in the $(N-M-2)^{th}$ one of the $(N-M-2)$ second fixing rods, and the $(N-M-2)^{th}$ one of the $(N-M-2)$ second fixing rods is located in the cavity of the receiving portion.

16. A rollable display device, comprising:
- a flexible display panel comprising a $1^{st}$ edge to an $N^{th}$ edge that are sequentially connected and are not collinear;
- a fixing portion comprising a plurality of fixing rods for fixing the plurality of edges of the flexible display panel when the flexible display panel is in a second state, wherein the plurality of fixing rods comprises a $1^{st}$ fixing rod to a $(N-1)^{th}$ fixing rod that are sequentially hinged or jointed, and the $1^{st}$ fixing rod to a $(N-2)^{th}$ fixing rod each comprise a cavity, where N is an integer larger than or equal to 3; and
- a receiving portion comprising a cavity,
- wherein in the second state, the flexible display panel is at least partially unrolled outside the receiving portion, and the $1^{st}$ fixing rod to the $(N-1)^{th}$ fixing rod are located outside the cavity to support the flexible display panel, and at least a part of at least one first fixing rod of the $1^{st}$ fixing rod to the $(N-1)^{th}$ fixing rod extends in a second direction, wherein the receiving portion is connected to the $N^{th}$ edge, and the $1^{st}$ fixing rod to the $(N-1)^{th}$ fixing rod are connected to the $1^{st}$ edge to a $(N-1)^{th}$ edge in one-to-one correspondence; a first end of the $1^{st}$ fixing rod is connected to a first end of the receiving portion, and a second end of the $(N-1)^{th}$ fixing rod is connected to a second end of the receiving portion by a first buckle structure,
- wherein in a first state, the flexible display panel is rolled and received into the cavity of the receiving portion with a first direction as an axis, and the $1^{st}$ fixing rod to the $(N-1)^{th}$ fixing rod are all located in the cavity of the receiving portion,
- wherein the first direction intersects with the second direction.

17. The rollable display device according to claim 16, wherein
- the first buckle structure comprises a protrusion portion and a limiting groove;
- the second end of the $(N-1)^{th}$ fixing rod comprises a top wall and a side wall connected to the top wall and surrounding the top wall;
- the second end of the receiving portion comprises a top wall and a side wall connected to the top wall and surrounding the top wall;
- the protrusion portion is located at the top wall of the $(N-1)^{th}$ fixing rod, and the protrusion portion extends from the top wall of the $(N-1)^{th}$ fixing rod in a direction facing away from the $(N-1)^{th}$ fixing rod; the limiting groove is located at the side wall of the receiving portion, and the limiting groove extends from the side wall of the receiving portion towards the receiving portion; and
- the protrusion portion is disposed in the limiting groove in an interference fit manner.

18. The rollable display device according to claim 16, wherein
- the first buckle structure comprises a protrusion portion and a limiting groove;
- the second end of the $(N-1)^{th}$ fixing rod comprises a top wall and a side wall connected to the top wall and surrounding the top wall;
- the second end of the receiving portion comprises a top wall and a side wall connected to the top wall and surrounding the top wall;
- the protrusion portion is located at the top wall of the receiving portion, and the protrusion portion extends from the top wall of the receiving portion in a direction facing away from the receiving portion; the limiting groove is located at the side wall of the $(N-1)^{th}$ fixing rod, and the limiting groove extends from the side wall of the $(N-1)^{th}$ fixing rod towards the $(N-1)^{th}$ fixing rod; and
- the protrusion portion is disposed in the limiting groove in an interference fit manner.

19. The rollable display device according to claim 16, wherein
- the receiving portion and the $1^{st}$ fixing rod to the $(N-2)^{th}$ fixing rod are each shaped as a hollow cylinder;
- an outer diameter of a $(i+1)^{th}$ fixing rod is smaller than an inner diameter of an $i^{th}$ fixing rod, and an outer diameter of the $1^{st}$ fixing rod is smaller than an inner diameter of the receiving portion; and
- in the first state, the $(i+1)^{th}$ fixing rod is located in the cavity of the $i^{th}$ fixing rod, and the $1^{st}$ fixing rod is located in the cavity of the receiving portion, where $1 \le i \le N+2$.

20. The rollable display device according to claim 16, wherein $N=4$;

- the flexible display panel comprises a display area and a light transmission area;
- the display area comprises a first display area, a third display area, and a second display area that are arranged along the first direction; wherein the light transmission area and the third display area are arranged along the second direction; in the first direction, the third display area and the light transmission area each are located between the first display area and the second display area; and along the second direction, a length of the third display area is smaller than a length of the first display area and smaller than a length of the second display area; and
- the $2^{nd}$ fixing rod comprises a second buckle structure or a magnet; and in the second state, the second buckle structure or the magnet of the $2^{nd}$ fixing rod is connected to an edge of the light transmission area.

* * * * *